(12) United States Patent
Funaya et al.

(10) Patent No.: US 6,263,393 B1
(45) Date of Patent: Jul. 17, 2001

(54) BUS SWITCH FOR REALIZING BUS TRANSACTIONS ACROSS TWO OR MORE BUSES

(75) Inventors: Koichi Funaya; Satoru Kaneda, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/251,434

(22) Filed: Feb. 17, 1999

(30) Foreign Application Priority Data

Feb. 17, 1998 (JP) .................................................. 10-035227

(51) Int. Cl.[7] ...................................................... G06F 13/00
(52) U.S. Cl. ........................... 710/131; 710/129; 710/240
(58) Field of Search .................................. 710/131, 132, 710/129, 128, 126, 240, 260

(56) References Cited

U.S. PATENT DOCUMENTS

| | | | | |
|---|---|---|---|---|
| 5,255,265 | * | 10/1993 | Eng et al. ................................. | 370/60 |
| 5,267,235 | * | 11/1993 | Thacker ................................... | 370/60 |
| 5,283,904 | * | 2/1994 | Carson et al. .......................... | 710/268 |
| 5,581,549 | * | 12/1996 | Mochinaga .............................. | 370/60 |

OTHER PUBLICATIONS

R.W. Horst, "TNet: A Reliable System Area Network", IEEE Micro, Feb. 1995, pp. 37–45.

B. Blau et al., "A Transparent Switching Fabric for PCI", HOT Interconnects IV, Aug. 15–17, 1996, pp. 215–219.

\* cited by examiner

Primary Examiner—Ario Etienne
(74) Attorney, Agent, or Firm—Sughrue, Mion, Zinn, Macpeak & Seas, PLLC

(57) ABSTRACT

A bus switch for realizing bus transaction across two or more buses comprises N (N: integer larger than 1) bus bridges, a switch module and a scheduler. When a transaction cell is generated by a bus bridge, the bus bridge adds a destination port number to the header of the transaction cell. The destination port number designates one of output ports of the switch module to which the transaction cell should be transferred. When the transaction cell is supplied to an input port of the switch module, an output port multiplexer of the switch module is controlled by the destination port number in the transaction cell, and the transaction cell is transferred to one of the output ports that corresponds to the destination port number, thereby the transaction cell is transferred to a destination bus bridge. By the addition of the destination port number, the scheduler does not have to directly control connection of a transfer path in the switch module. Therefore, the scheduler and the switch module do not have to be connected together via lines, and thus the scheduler and the switch module can be formed in separate and independent two LSIs. Consequently, the number of buses connected to the bus switch can be increased easier in comparison with conventional bus switches.

18 Claims, 38 Drawing Sheets

FIG. 7

| INPUT | OUTPUT | | |
|---|---|---|---|
| OUTPUT PORT MULTIPLEXER CONTROL SIGNAL 201 | OUTPUT PORT MULTIPLEXER FIRST OUTPUT 203 | OUTPUT PORT MULTIPLEXER SECOND OUTPUT 204 | OUTPUT PORT MULTIPLEXER THIRD OUTPUT 205 |
| 01100 | HIGH IMPEDANCE | HIGH IMPEDANCE | HIGH IMPEDANCE |
| 01101 | WORD 202 | HIGH IMPEDANCE | HIGH IMPEDANCE |
| 01110 | HIGH IMPEDANCE | WORD 202 | HIGH IMPEDANCE |
| 01111 | HIGH IMPEDANCE | HIGH IMPEDANCE | WORD 202 |
| 1xxxx | NOT CHANGED | NOT CHANGED | NOT CHANGED |
| 010xx | HIGH IMPEDANCE | HIGH IMPEDANCE | HIGH IMPEDANCE |
| 000xx | HIGH IMPEDANCE | HIGH IMPEDANCE | HIGH IMPEDANCE |

FIG. 12

| INPUT | OUTPUT | |
|---|---|---|
| SWITCH MULTIPLEXER CONTROL SIGNAL 206 | SWITCH MULTIPLEXER FIRST OUTPUT 207 | SWITCH MULTIPLEXER SECOND OUTPUT 208 |
| 000 | HIGH IMPEDANCE | HIGH IMPEDANCE |
| 001 | HIGH IMPEDANCE | WORD 202 |
| 010 | WORD 202 | HIGH IMPEDANCE |
| 011 | WORD 202 | HIGH IMPEDANCE |
| 1xx | WORD 202 | HIGH IMPEDANCE |

FIG. 13

| INPUT | | OUTPUT |
|---|---|---|
| FIRST CONTROL SIGNAL 224 | SECOND CONTROL SIGNAL 225 | OUTPUT PORT SELECTOR OUTPUT SIGNAL 227 |
| xxx | 0010 | BUS CONTROL SIGNAL WORD 222 |
| 011 | 0000 | TRANSACTION WORD 221 |
| 010 | 0000 | TRANSACTION WORD 221 |
| 1xx | 0000 | TRANSACTION WORD 221 |
| 000 | 0000 | INVALID WORD |

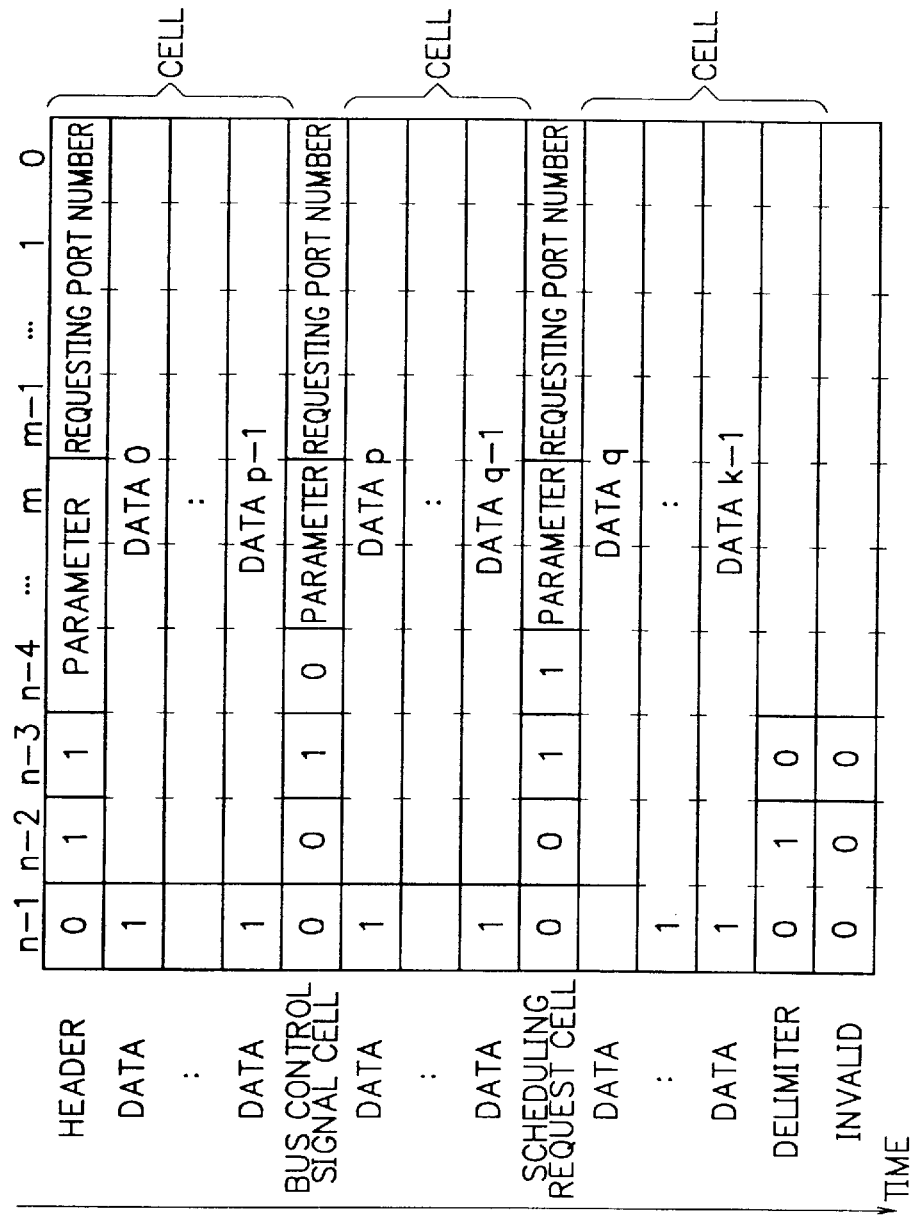

F I G. 15
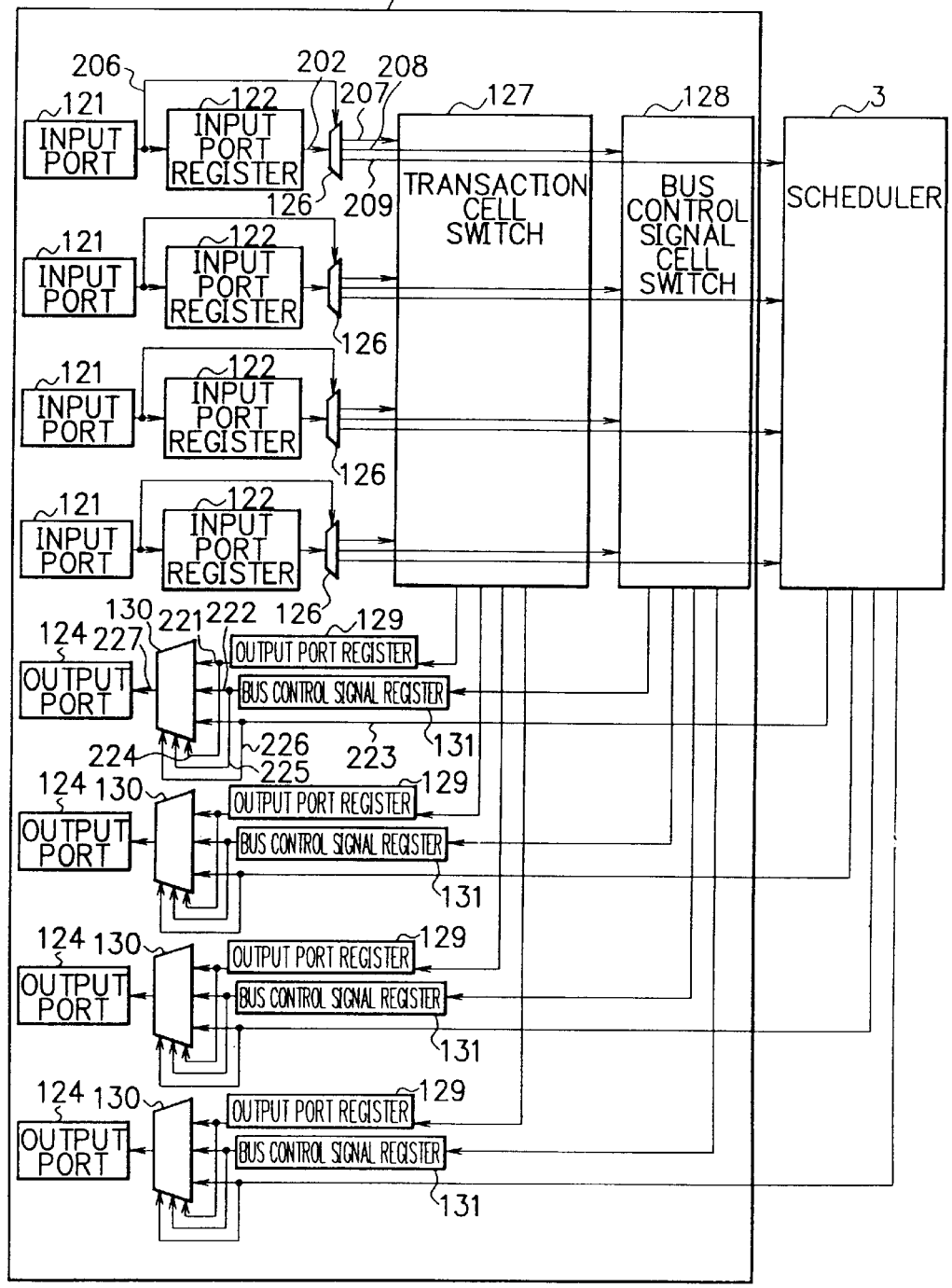

FIG. 16

| INPUT | OUTPUT | | |
|---|---|---|---|
| SWITCH MULTIPLEXER CONTROL SIGNAL 206 | SWITCH MULTIPLEXER FIRST OUTPUT 207 | SWITCH MULTIPLEXER SECOND OUTPUT 208 | SWITCH MULTIPLEXER THIRD OUTPUT 209 |
| 000x | HIGH IMPEDANCE | HIGH IMPEDANCE | HIGH IMPEDANCE |
| 0010 | HIGH IMPEDANCE | WORD 202 | HIGH IMPEDANCE |
| 0011 | HIGH IMPEDANCE | HIGH IMPEDANCE | WORD 202 |
| 01xx | WORD 202 | HIGH IMPEDANCE | HIGH IMPEDANCE |
| 1xxx | WORD 202 | HIGH IMPEDANCE | HIGH IMPEDANCE |

FIG. 17

| INPUT | | | OUTPUT |
|---|---|---|---|
| FIRST CONTROL SIGNAL 224 | SECOND CONTROL SIGNAL 225 | THIRD CONTROL SIGNAL 226 | OUTPUT PORT SELECTOR OUTPUT SIGNAL 227 |
| xxx | xxxx | 0011 | SCHEDULING WORD 223 |
| xxx | 0010 | 0000 | BUS CONTROL SIGNAL WORD 222 |
| 011 | 0000 | 0000 | TRANSACTION WORD 221 |
| 010 | 0000 | 0000 | TRANSACTION WORD 221 |
| 1xx | 0000 | 0000 | TRANSACTION WORD 221 |
| 000 | 0000 | 0000 | INVALID WORD |

F I G. 36

| INPUT | | | | OUTPUT |
|---|---|---|---|---|
| WORD TYPE IDENTIFICATION BITS 271 | INTERRUPT SIGNAL IDENTIFICATION BITS 272 | HOST INTERRUPT LINE IDENTIFICATION BITS 273 | INTERRUPT STATUS REGISTER IDENTIFICATION BITS 274 | HOST-SIDE INTERRUPT LINES 242 |
| 001 | 01 | 00 | q | SET BIT 244-1-q |
| 001 | 01 | 01 | q | SET BIT 244-2-q |
| 001 | 01 | 10 | q | SET BIT 244-3-q |
| 001 | 01 | 11 | q | SET BIT 244-4-q |
| xxx | NOT 01 | xx | x | NO CHANGE |
| NOT 001 | xxx | xx | x | NO CHANGE |

F I G. 37
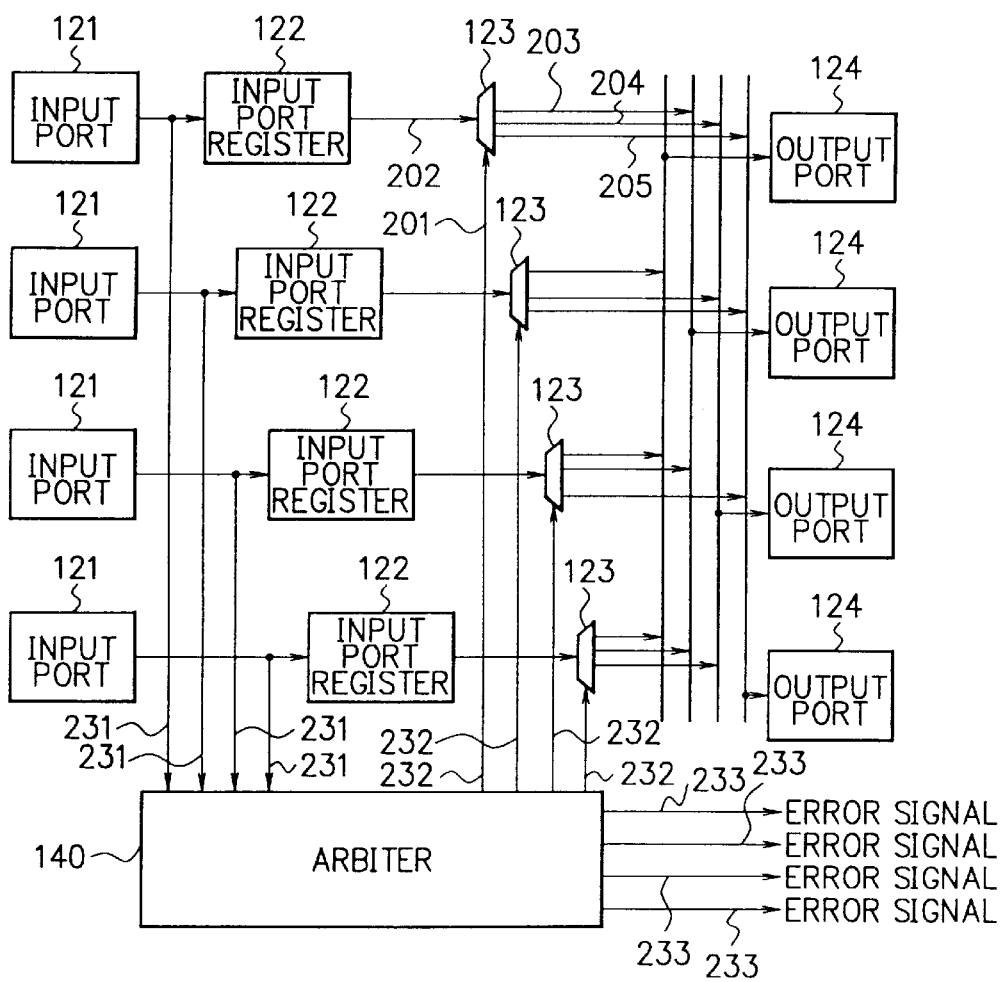

BUS SWITCH FOR REALIZING BUS TRANSACTIONS ACROSS TWO OR MORE BUSES

BACKGROUND OF THE INVENTION

The present invention relates to a bus switch which is provided in a computer in order to realize bus transaction across two or more buses.

Description of the Prior Art

A computer is generally provided with a bus switch in order to realize bus transaction (transfer of control signals (commands), data, etc.) across two or more buses. One or more devices (CPU, memory, an HDD via a slot, a modem via a slot, etc.) are connected to a bus, and such buses are connected together by the bus switch. Data which occurred on a bus (i.e. data which is transmitted by a device that is connected to the bus) is transferred to another bus by the bus switch.

A bus switch typically includes two or more bus bridges, a switch module (a crossbar switch) and a scheduler. Each bus bridge is connected to a corresponding bus in a one-to-one correspondence. In some types of bus switches, the bus bridge converts an address and/or a command and/or data on the bus into one or more cells. The cell generated by the bus bridge is temporarily stored in a cell buffer of the bus bridge, and transmitted to the switch module after transfer permission is given to the cell by the scheduler. The switch module is provided with two or more input ports and two or more output ports. Each input port of the switch module is connected to a corresponding bus bridge in a one-to-one correspondence, and each output port of the switch module is connected to a corresponding bus bridge in a one-to-one correspondence. The switch module transfers the cell from one of its input ports (to which the cell is supplied) to one of its output ports. The cell outputted from the output port is supplied to another bus bridge that corresponds to the output port. The bus bridge converts the cell into an address and/or a command and/or data, and transmits them to a bus that is connected to the bus bridge.

An example of a conventional bus switch is described in a document: Robert W.Horst, "TNet: A Reliable System Area Network", IEEE Micro, February 1995, pages 37–45 (hereafter, referred to as "document No. 1"). Also in the conventional bus switch described in the document No. 1, a scheduler gives transfer permission to a cell which has been stored in a cell buffer, and supplies a control signal to a switch module (crossbar switch) and thereby connects a permitted transfer path in the switch module.

In such a bus switch, a transaction cell is provided with a delimiter, which is a word that indicates the end of the transaction cell, to its end. The switch module of the bus switch judges that the transaction cell has passed the switch module by detecting the delimiter. When the delimiter is detected, the switch module releases the transfer path which has been assigned to the transaction cell, and requests next scheduling to the scheduler.

When the number of buses connected to the bus switch has to be increased, the number of the bus bridges in the bus switch has to be increased according to the number of the buses, and the number of ports of the switch module has to be increased according to the number of the bus bridges. In order to increase the number of output ports of the switch module of the bus switch, many stages of crossbar switches used to be connected together, for example, as described in the document No. 1and a document: Bob Blau, Barry Isenstein, "A Transparent Switching Fabric for PCI", HOT Interconnects IV, Aug. 15–17, 1996, pages 215–219.

The bus switch is also needed to transfer interrupt signals as well as the transaction cells. In some types of conventional bus switches, special-purpose interrupt signal lines are used specifically for transferring the interrupt signals, in the same way as a device which is described in U.S. Pat. No. 5,283,904.

After a cell passed the switch module, a transfer path which has been assigned to the cell has to be released and the next assignment of a transfer path in the switch module has to be started. For this, the switch module detects a transfer request which is sent from a bus bridge and informs the scheduler about the transfer request. Or a bus bridge that has received a cell via the switch module informs a control section of the switch module about completion of cell reception and its free buffer capacity, as described in the document No. 1.

In a switch module that is designed to execute switching and transfer of cells, an address and/or a command and/or data which are driven on a bus are packed into one or more cells and the cells are supplied to the switch module. The switch module transfers each cell to a destination output port of the cell, in units of cells. Therefore, a cell is transferred in the switch module as a single unit. In the conventional bus switch described in the document No. 1, a switch module executes switching and transfer in units of cells (packets) each of which including a header, an address, data and an error correction signal.

There exist several types of cells to be transferred by the switch module in the bus switch, such as transaction cells, bus control signal cells, scheduling cells, etc. Generally, these cells are not divided according to the type of cells and transferred by a common switch module and lines, as described in U.S. Pat. No. 5,255,265 and U.S. Pat. No. 5,267,235.

In a switch module of such conventional bus switches, a cell inputted to an input port of the switch module is necessarily transferred to one of the output ports of the switch module, regardless of whether the cell has been given a transfer permission by the scheduler or not, as described in U.S. Pat. No. 5,255,265 and U.S. Pat. No. 5,267,235.

The conventional bus switches described above involves the following problems or drawbacks.

First, the scheduler for assigning a transfer path to a cell directly controls connection of the transfer path in the switch module. Therefore, the scheduler and the switch module have to be connected via lines, or the scheduler and the switch module have to be formed on one LSI. In the case where the scheduler and the switch module are formed on one LSI, the number of buses which are connected to the bus switch can not be increased much, since the number of buses is limited by the number of gates and the number of pins of the LSI. On the other hand, in the case where the scheduler and the switch module are connected via lines, large bit width or band width of the lines becomes necessary, and thus design and construction of the bus switch becomes difficult.

Second, in the conventional bus switch in which the transaction cells, the bus control signal cells and the scheduling cells are not divided according to the type and transferred by a common switch module and lines, transfer of the bus control signal cells and the scheduling cells decreases the bandwidth of the line between the bus bridge and the switch module, thereby transfer throughput of the transaction cells via the line between the bus bridge and the switch module is necessitated to be decreased.

Third, in the conventional bus switches, a transfer path which has been set in the switch module is released when a delimiter (i.e. a word which indicates the end of a transaction cell) of a cell is detected, and then next scheduling is requested to the scheduler. However, some time period is necessary from the detection of the delimiter and completion of the next scheduling by the scheduler, and no transfer path can be utilized in the switch module during the time period. By this, the availability of the switch module has to be lowered and the throughput of the bus switch has to be decreased.

Fourth, as mentioned above, many-stage-connection of crossbar switches has to be employed in order to increase the number of buses connected to the bus switch. However, for the many-stage connection of crossbar switches, buffers have to be provided between the crossbar switches and flow control between the crossbar switches has to be executed. Further, the scheduler has to execute assignment of transfer paths across two or more crossbar switches, and thus complex algorithm and long processing time become necessary.

Fifth, in the case where special-purpose interrupt signal lines are employed specifically for transferring the interrupt signals, hardware for the special-purpose interrupt signal lines becomes necessary. Further, complex design of the special-purpose interrupt signal lines becomes necessary when the distance between two buses (the distance between two bus bridges) becomes long.

Sixth, if a cell which has not been given a transfer permission by the scheduler is inputted to an input port of the switch module by some error and transferred to an output port of the switch module, the cell might collide with another cell (which has received a transfer permission by the scheduler and which has been inputted to another input port of the switch module) at the output port. The cell collision at the output port might cause malfunction and destruction of the switch module.

Seventh, in the case where the physical distance between the bus bridge and the switch module is large, the time necessary for communication between the bus bridge and the switch module is necessitated to be long, and the time necessary for transfer path assignment in the switch module is necessitated to be long, and thus the availability of the switch module used to be lowered and the throughput of the bus switch used to be decreased.

Eighth, as described before, after a cell passed the switch module, a transfer path which has been assigned to the cell has to be released and the next assignment of a transfer path in the switch module has to be started. In the conventional bus switch in which the switch module detects a transfer request from a bus bridge and informs the scheduler about the cell transfer completion, special-purpose lines have to be provided between the switch module and the scheduler, or the switch module and the scheduler have to be formed on one LSI.

In the conventional bus switch in which a bus bridge that has received a cell via the switch module informs the switch module about completion of cell transfer, information of the completion of cell transfer to the scheduler tends to be late, and thus transfer path assignment in the switch module is necessitated to be late. Therefore, the availability of the switch module is necessitated to be lowered and the throughput of the bus switch is necessitated to be decreased.

Ninth, in the conventional bus switches, a cell is transferred in the switch module as a single unit. Therefore, another cell generated by the bus bridge during cell transmission by the bus bridge has to wait for completion of the cell transmission in a cell buffer. Therefore, a bus control signal cell which is generated by converting a bus control signal (an error signal, an interrupt signal, etc.) on the bus and a scheduling cell which is used for the transfer path assignment in the switch module have to wait for completion of transfer of a transaction cell. By the delay of the bus control signal cell, operations concerning interrupt, abnormal end (ABEND), etc. are delayed, and response of the bus switch has to be deteriorated. By the delay of the scheduling cell, the throughput of the switch module used to be decreased.

SUMMARY OF THE INVENTION

It is therefore the primary object of the present invention to provide a bus switch, in which direct control by the scheduler for transfer path connection in the switch module becomes unnecessary, and thereby the switch module and the scheduler does not have to be connected via lines, nor have to be formed on one LSI.

Another object of the present invention is to provide a bus switch, by which the number of buses which are connected to the bus switch can easily be increased.

Another object of the present invention is to provide a bus switch, by which the availability of the switch module can be raised and the throughput of the bus switch can be increased.

Another object of the present invention is to provide a bus switch, by which the number of buses connected to the bus switch can be increased without employing many-stage-connection of crossbar switches, and without needing buffers and flow control between the crossbar switches.

Another object of the present invention is to provide a bus switch, by which interrupt signals can be transferred between far-off buses (bus switches) with simple design of interrupt signal lines.

Another object of the present invention is to provide a bus switch, by which cell collision at output ports of the switch module can be avoided and thereby malfunction and destruction of the switch module can be prevented.

Another object of the present invention is to provide a bus switch, by which deterioration of the availability of the switch module and the throughput of the bus switch can be avoided even if the physical distance between the bus bridge and the switch module is large.

Another object of the present invention is to provide a bus switch, in which transfer path assignment by the scheduler can be executed without delay after completion of cell transfer in the switch module.

Another object of the present invention is to provide a bus switch, in which a bus control signal cell can be inserted in a transaction cell and thereby the bus control signal cell containing an error signal, an interrupt signal, etc. can be transferred faster.

Another object of the present invention is to provide a bus switch, in which a scheduling cell can be inserted in a transaction cell and thereby the scheduling cell used for transfer path assignment in the switch module can be transferred faster.

In accordance with a first aspect of the present invention, there is provided a bus switch for realizing bus transaction across two or more buses, comprising N (N: integer larger than 1) bus bridges, a switch module and a scheduler. Each of the N bus bridges is connected with a bus for converting an address and/or a command and/or data or an interrupt signal or an error signal which occurred on the bus into one or more cells and transmitting the cells to a switch module, and for converting a cell supplied from the switch module into an address and/or a command and/or data or an interrupt signal or an error signal and transmitting the address and/or the command and/or data or the interrupt signal or the error signal to the bus. The switch module is provided with N input ports corresponding to each of the bus bridges for receiving cells from the bus bridges and N output ports corresponding to each of the bus bridges for transmitting cells to the bus bridges. The switch module transfers the cell from one of the input ports to one of the output ports and transmits the cell from the output port to a bus bridge corresponding to the output port. The scheduler receives a scheduling request concerning a cell from a bus bridge, checks whether or not cell collision at the output ports of the switch module will occur, and gives transmission permission of the cell to the bus bridge if the cell collision will not occur. Especially, the bus bridge adds a destination port number indicating one of the output ports of the switch module to a cell when generating the cell, and the switch module transfers the cell to one of the output ports that is designated by the destination port number in the cell.

In accordance with a second aspect of the present invention, in the first aspect, the bus bridge adds the destination port number to the first word of the cell.

In accordance with a third aspect of the present invention, in the first aspect, the bus bridge informs the scheduler about completion of transmission of each cell.

In accordance with a fourth aspect of the present invention, in the first aspect, the cell generated by the bus bridge is composed of a plurality of words each of which including word type identification bits for indicating the type of the word.

In accordance with a fifth aspect of the present invention, in the fourth aspect, the word type identification bits are used by the switch module for discriminating between a header of a transaction cell, data of a transaction cell, a delimiter of a transaction cell and an invalid word.

In accordance with a sixth aspect of the present invention, in the fourth aspect, the switch module includes two or more independent cell switch means corresponding to a cell type, and each word of cells is distributed to one of the cell switch means based on the word type identification bits of the word, and each of the cell switch means transfers the distributed word to one of the output ports of the switch module according to the destination port number of a cell in which the word is included.

In accordance with a seventh aspect of the present invention, in the sixth aspect, the two or more independent cell switch means includes a transaction cell switch and a bus control signal cell switch. The transaction cell switch is a cell switch means for transferring words of a transaction cell to one of the output ports of the switch module, and the bus control signal cell switch is a cell switch means for transferring words of a bus control signal cell to one of the output ports of the switch module.

In accordance with an eighth aspect of the present invention, in the fourth aspect, the switch module transfers a word to the scheduler in the case where the word type identification bits in the word indicate that the word is part of a scheduling request cell.

In accordance with a ninth aspect of the present invention, in the first aspect, the bus switch further comprises a bus control signal cell switch means for transferring a bus control signal cell, which has been generated by a bus bridge by converting a bus control signal to a cell, to another bus bridge that corresponds to the destination port number of the bus control signal cell.

In accordance with a tenth aspect of the present invention, in the ninth aspect, the bus switch further comprises N bus control signal cell lines each of which is a special-purpose line specifically used for transferring the bus control signal cell between the bus bridge and the bus control signal cell switch means.

In accordance with an eleventh aspect of the present invention, in the first aspect, the bus switch further comprises N scheduling cell lines each of which is a special-purpose line specifically used for transferring scheduling cells between the bus bridge and the scheduler.

In accordance with a twelfth aspect of the present invention, in the first aspect, the bus bridge adds cell ending information bits, which indicates that a transaction cell will end after a predetermined number of words, to a specific word of the transaction cell, and thereby lets the scheduler know that transfer of the transaction cell in the switch module will be over after the predetermined number of words.

In accordance with a thirteenth aspect of the present invention, in the first aspect, the switch module is composed of M equivalent switch modules. The cell to be generated by the bus bridge is partitioned into M subcells (M: integer larger than 1) each of which including a destination port number, by partitioning each word of the cell into M segments. Each of the M subcells is sent to corresponding one of the M switch modules respectively to be transferred by the corresponding switch module to a destination bus bridge according to the destination port number. The M subcells which have been transferred to the destination bus bridge are combined together by the destination bus bridge.

In accordance with a fourteenth aspect of the present invention, in the first aspect, when the bus bridge received a device interrupt signal from a device, the bus bridge generates an interrupt signal cell corresponding to the device interrupt signal which is addressed to a host-side bus bridge, and sends the interrupt signal cell to the host-side bus bridge via the switch module. The host-side bus bridge which received the interrupt signal cell informs an interrupt controller of a host processor about occurrence of an interrupt and information concerning the device that has outputted the device interrupt signal by activating one of host-side interrupt lines between the host-side bus bridge and the interrupt controller that corresponds to the device that has outputted the device interrupt signal.

In accordance with a fifteenth aspect of the present invention, in the fourteenth aspect, the host-side bus bridge which received the interrupt signal cell sets a particular bit of its interrupt status register that corresponds to the device that has outputted the device interrupt signal so that the host processor will be able to read the value of the interrupt status register and thereby identify the device that has outputted the device interrupt signal. The host-side bus bridge informs the interrupt controller of the host processor about occurrence of an interrupt and information concerning the device that has outputted the device interrupt signal by activating one of the host-side interrupt lines that corresponds to the particular bit of the interrupt status register.

In accordance with a sixteenth aspect of the present invention, in the first aspect, the switch module includes a collision detection means for judging whether or not cell collision at the output ports of the switch module will occur. In the collision detection means, a line corresponding to the destination port number of a cell is set when the cell is inputted to the switch module, and the line is reset when the cell passed the switch module. In the case where the line of the collision detection means corresponding to the destination port number of the inputted cell has already been set, the collision detection means judges that the cell has not been given a transfer permission by the scheduler but has been supplied to the switch module by accident or the destination port number of the cell has changed by data error etc., and abandons the cell and outputs an error signal for starting error procedure.

In accordance with a seventeenth aspect of the present invention, in the first aspect, a cell buffer, in which cells generated by the bus bridge are temporarily stored waiting for the transfer permission by the scheduler, is provided separately from the bus bridge and connected to the bus bridge via lines.

In accordance with an eighteenth aspect of the present invention, in the seventeenth aspect, the cell buffer is placed near the scheduler and the switch module.

BRIEF DESCRIPTION OF THE DRAWINGS

The objects and features of the present invention will become more apparent from the consideration of the following detailed description taken in conjunction with the accompanying drawings, in which:

FIG. 7 is a table showing an example of the correspondence between the input and the output of an output port multiplexer which is included in the switch module of FIG. 6;

FIG. 12 is a table showing the correspondence between the input and the output of a switch multiplexer which is included in the switch module of FIG. 11;

FIG. 13 is a table showing the correspondence between the input and the output of an output port selector which is included in the switch module of FIG. 11;

FIG. 14 is a schematic diagram showing a time sequence of words which is realized by a fourth embodiment of the present invention, in which a bus control signal cell and a scheduling cell are inserted in a transaction cell by use of the word type identification bits.

FIG. 15 is a block diagram showing an example of internal composition of a switch module which transfers the transaction cell, the bus control signal cell and the scheduling cell of FIG. 14;

FIG. 16 is a table showing the correspondence between the input and the output of a switch multiplexer which is included in the switch module of FIG. 15;

FIG. 17 is a table showing the correspondence between the input and the output of an output port selector which is included in the switch module of FIG. 15;

FIG. 36 is a table showing an example of the correspondence between the input and the output of the interrupt line controller of FIG. 35;

FIG. 37 is a block diagram showing an example of internal composition of a switch module which is included in a bus switch according to a tenth embodiment of the present invention;

DESCRIPTION OF THE PREFERRED EMBODIMENTS

Figure 1:
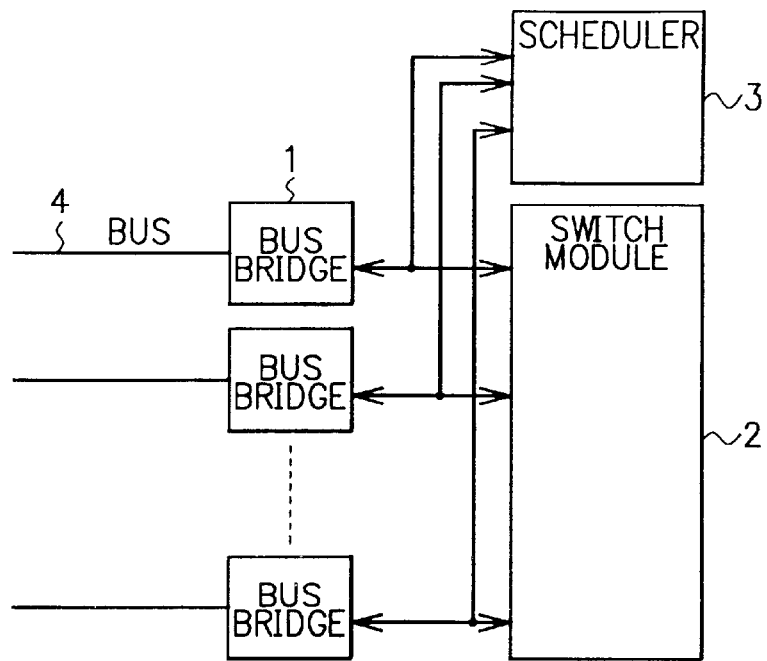
FIG. 1 is a block diagram showing a bus switch according to a first embodiment of the present invention.

Referring now to the drawings, a description will be given in detail of preferred embodiments in accordance with the present invention.

FIG. 1 is a block diagram showing a bus switch according to a first embodiment of the present invention. Referring to FIG. 1, the bus switch comprises a plurality of bus bridges 1, a switch module 2, and a scheduler 3. A plurality of buses 4 are connected to the bus switch. Each bus 4 is connected to corresponding one of the bus bridges 1, and each bus bridge 1 is connected to the switch module 2 and the scheduler 3.

Figure 2:
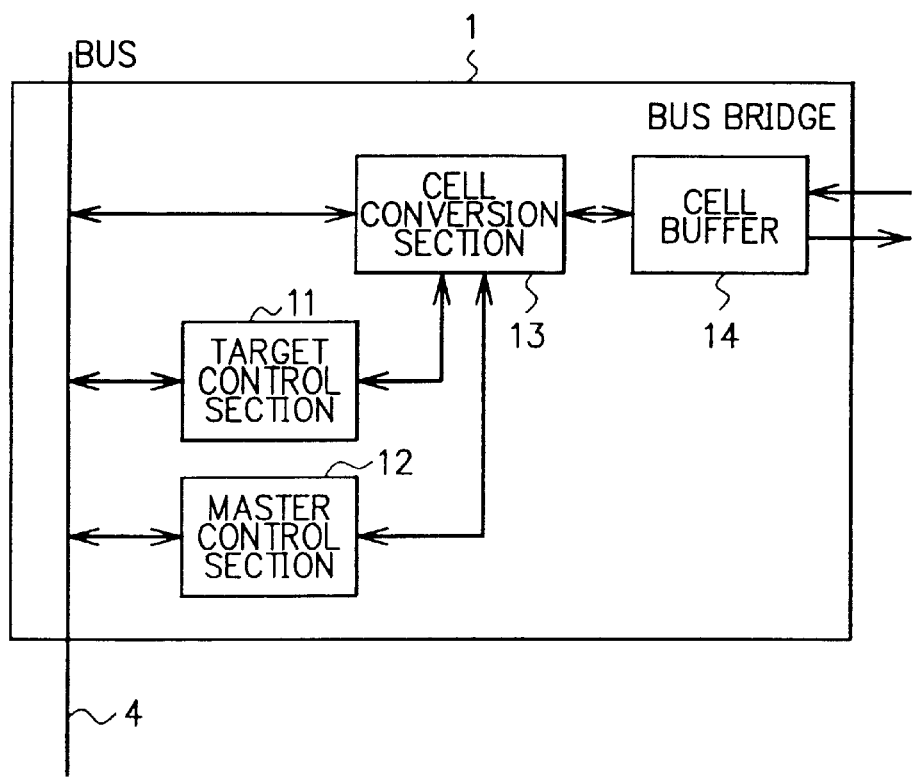
FIG. 2 is a block diagram showing an example of internal composition of a bus bridge which is included in the bus switch of FIG. 1.

FIG. 2 is a block diagram showing an example of internal composition of the bus bridge 1. Referring to FIG. 2, the bus bridge 1 is composed of a target control section 11, a master control section 12, a cell conversion section 13, and a cell buffer 14. The target control section 11 controls the bus 4 when the bus bridge 1 operates as a target on the bus 4. The master control section 12 controls the bus 4 when the bus bridge 1 operates as the master on the bus 4. The cell conversion section 13 converts an address and/or a command and/or data occurred on the bus 4 (i.e. an address and/or a command and/or data transmitted by a device which is connected to the bus 4) into one or more cells to be transferred by the switch module 2, and converts a cell which has been transferred by the switch module 2 and received by the cell buffer 14 into an address and/or a command and/or data or a bus control signal on the bus 4. The cell buffer 14 temporarily stores cells which have been generated by the cell conversion section 13, and transmits one of the cells to the switch module 2 after a transfer path for the cell in the switch module 2 has been permitted by the scheduler 3. The cell buffer 14 also temporarily stores cells which are sent from the switch module 2 and sends the cells to the cell conversion section 13.

Figure 3:
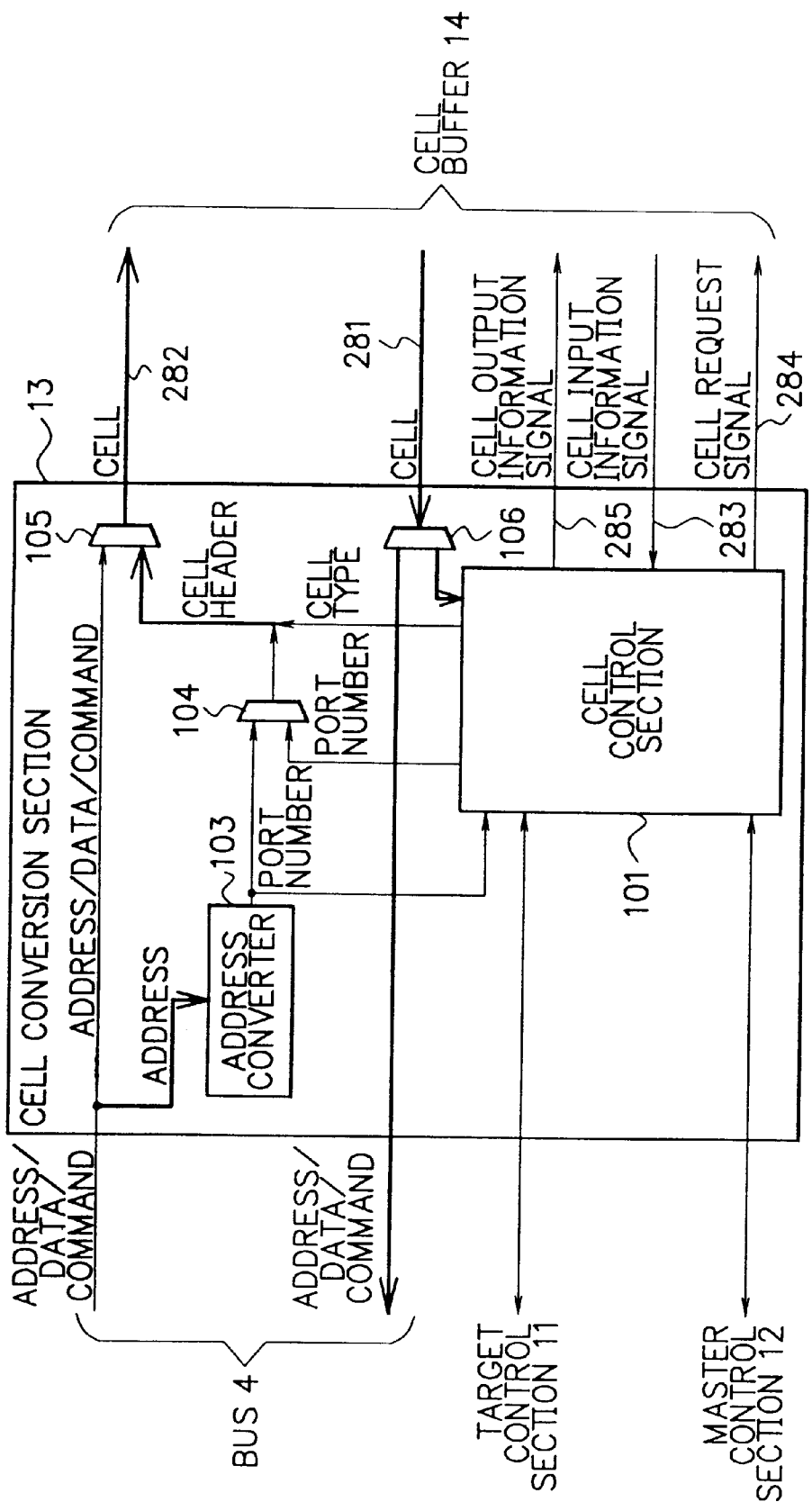
FIG. 3 is a block diagram showing an example of internal composition of a cell conversion section which is included in the bus bridge of FIG. 2.

FIG. 3 is a block diagram showing an example of internal composition of the cell conversion section 13. Referring to FIG. 3, the cell conversion section 13 is composed of a cell control section 101, an address converter 103, selectors 104 and 105, and a multiplexer 106. An address and/or a command and/or data which are driven on the bus 4 are supplied to the selector 105 and the address converter 103. The address converter 103 converts the address on the bus 4 into a port number of the switch module 2. The selector 104 makes a selection from the port number outputted by the address converter 103 and a port number which has been latched by the cell control section 101, and outputs the selected port number, according to control of the cell control section 101. The port number bits outputted by the selector 104 and cell type bits outputted by the cell control section 101 are added together to form a cell header. The selector 105 first outputs the cell header for first one or more words of a cell, and thereafter outputs the address and/or the command and/or data on the bus 4. Incidentally, a "word" is a predetermined amount of data which is transferred at an input port of the switch module 2 during one clock cycle. The output of the selector 105 is supplied to the cell buffer 14. On the other hand, a cell that is supplied from the cell buffer 14 to the cell conversion section 13 is inputted to the multiplexer 106. The multiplexer 106 outputs a cell header and a command which have been included in the cell to the cell control section 101, and outputs an address and/or a command and/or data which have been included in the cell into the bus 4.

In the following, the operation of the cell control section 101 will be explained. Hereafter, explanation will be given on the assumption that the bus 4 is a PCI bus. A common 32-bit line is used as both an address line and a data line, and a 4-bit line is used as a command line. The operation of the cell control section 101 when the bus bridge 1 operates as the master is different from the operation of the cell control section 101 when the bus bridge 1 operates as a target. In either case, the operation of the cell control section 101 when the bus bridge 1 executes writing is different from the operation of the cell control section 101 when the bus bridge 1 executes reading.

When the bus bridge 1 executes writing operation as a target, the target control section 11 informs the cell control section 101 that an address and a command are being driven on the bus 4. The cell control section 101 lets the selector 104 select the output of the address converter 103 as the port number, and outputs a cell type which indicates the type of a cell. The port number bits outputted by the selector 104 and the cell type bits outputted by the cell control section 101 are added together to form a cell header, and the cell header is outputted by the selector 105 according to control of the cell control section 101. The cell control section 101 informs the cell buffer 14 that the cell is supplied from the cell conversion section 13 to the cell buffer 14, using a cell output information signal 285. Subsequently, the cell control section 101 informs the cell buffer 14 that cell transmission is still continuing, and lets the selector 105 output the address and the command as words following the cell header. Subsequently, the target control section 11 informs the cell control section 101 that data is being driven on the bus 4. The cell control section 101 informs the cell buffer 14 that cell transmission is still continuing, and lets the selector 105 output the data.

When the bus bridge 1 executes reading operation as a target, the target control section 11 informs the cell control section 101 that an address and a command are being driven on the bus 4. The cell control section 101 lets the selector 104 select the output of the address converter 103 as the port number, and outputs a cell type which indicates the type of a cell. The port number bits outputted by the selector 104 and the cell type bits outputted by the cell control section 101 are added together to form a cell header, and the cell header is outputted by the selector 105 according to control of the cell control section 101. The cell control section 101 informs the cell buffer 14 that the cell is supplied from the cell conversion section 13 to the cell buffer 14, using the cell output information signal 285. Subsequently, the cell control section 101 informs the cell buffer 14 that cell transmission is still continuing using the cell output information signal 285, and transmits an address and a command via the selector 105 as words following the cell header. Subsequently, the target control section 11 waits for arrival of read data. When a cell which includes read data reached the cell buffer 14, the cell buffer 14 informs the cell control section 101 of arrival of the cell using a cell input information signal 283. Subsequently, the cell control section 101 instructs the cell buffer 14 to start sending the cell, using a cell request signal 284, and receives a cell header of the cell via the multiplexer 106. Subsequently, the cell control section 101 informs the target control section 11 that the read data has arrived, and lets the multiplexer 106 output the read data to the bus 4.

When the bus bridge 1 executes writing operation as the master, the cell control section 101 operates as follows. First, the cell control section 101 is informed of arrival of a cell by the cell input information signal 283 which is sent from the cell buffer 14. Subsequently, the cell control section 101 instructs the cell buffer 14 to start sending the cell, using the cell request signal 284, and receives a cell header of the cell via the multiplexer 106. Subsequently, the cell control section 101 lets the multiplexer 106 output an address and a command which have been included in the cell to the bus 4. The cell control section 101 receives the command and thereby instructs the master control section 12 to start writing operation. When an instruction for starting data transmission is supplied from the master control section 12, the cell control section 101 instructs the cell buffer 14 to send data, which is the remainder of the cell, and lets the multiplexer 106 output the data to the bus 4.

When the bus bridge 1 executes reading operation as the master, the cell control section 101 operates as follows. First, the cell control section 101 is informed of arrival of a cell by the cell input information signal 283 which is sent from the cell buffer 14. Subsequently, the cell control section 101 instructs the cell buffer 14 to start sending the cell, using the cell request signal 284, receives a cell header of the cell via the multiplexer 106, and stores a port number that is included in the cell header into its register. Subsequently, the cell control section 101 lets the multiplexer 106 output an address and a command which have been included in the cell to the bus 4. The cell control section 101 receives the command and thereby instructs the master control section 12 to start reading operation. Subsequently, the cell control section 101 lets the selector 104 output the port number which has been stored in its register, and also outputs a corresponding cell type. The port number bits and the cell type bits are added together to form a cell header, and the cell header is supplied to the selector 105. Subsequently, the cell control section 101 informs the cell buffer 14 about cell transmission, and thereafter lets the selector 105 output the cell header to the cell buffer 14. When an instruction for data reading is supplied from the master control section 12, the cell control section 101 lets the selector 105 output data which is driven on the bus 4 to the cell buffer 14.

Figure 4:
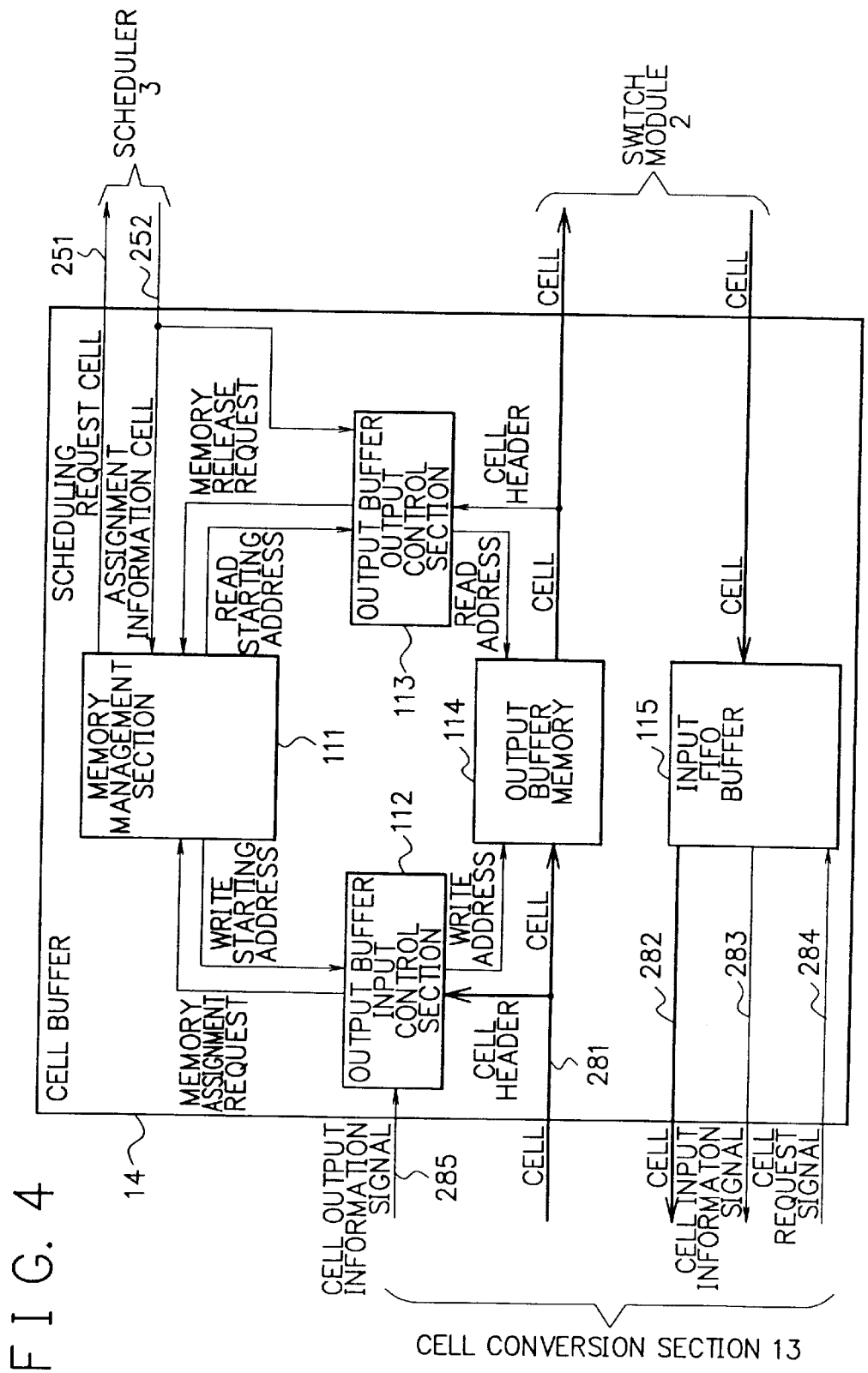
FIG. 4 is a block diagram showing an example of internal composition of a cell buffer which is included in the bus bridge of FIG. 2.

FIG. 4 is a block diagram showing an example of internal composition of the cell buffer 14. Referring to FIG. 4, the cell buffer 14 is composed of a memory management section 111, an output buffer input control section 112, an output buffer output control section 113, an output buffer memory 114, and an input FIFO buffer 115. When a cell is supplied from the cell conversion section 13 to the cell buffer 14, the cell is first inputted to the output buffer input control section 112. The output buffer input control section 112 requests the memory management section 111 memory assignment for one cell, based on the inputted cell header. The memory management section 111 figures out usable memory area in the output buffer memory 114, and sends a starting address (i.e. a write starting address) of the usable memory area to the output buffer input control section 112. The output buffer input control section 112 which received the write starting address sets the initial value of a write address to the write starting address. The output buffer input control section 112 supplies the write address to the output buffer memory 114, successively incrementing the write address by a predetermined value for one word, as each word of the cell is stored in the output buffer memory 114. The output buffer memory 114 stores each word of the cell at the write address.

In the case where a cell has been stored in the output buffer memory 114, the memory management section 111 transmits a scheduling request cell to the scheduler 3. The scheduling request cell is a cell for requesting the scheduler 3 to assign a transfer path in the switch module 2 for the cell that has been stored in the output buffer memory 114. The scheduler 3 which received the scheduling request cell judges whether the assignment of a transfer path in the switch module 2 is possible or not, and if possible, transmits an assignment information cell to the memory management section 111 and the output buffer output control section 113. The memory management section 111 which received the assignment information cell outputs a starting address of the output buffer memory 114 in which the cell (to which the transfer path in the switch module 2 has been assigned by the scheduler 3) has been stored (i.e. a read starting address) to the output buffer output control section 113.

The output buffer output control section 113 which received the assignment information cell sets the initial value of a read address to the read starting address supplied from the memory management section 111. The output buffer output control section 113 supplies the read address to the output buffer memory 114 successively incrementing the read address by a predetermined value for one word, as each word of the cell is outputted from the output buffer memory 114. The output buffer memory 114 reads out and outputs each word of the cell from the read address, and outputs the words of the cell to the switch module 2 as a transaction cell.

On the other hand, when a transaction cell is supplied from the switch module 2 to the cell buffer 14, the transaction cell is inputted to the input FIFO buffer 115. In the case where a cell is buffered in the input FIFO buffer 115, the input FIFO buffer 115 outputs the cell input information signal 283 to the cell conversion section 13. When the cell request signal 284 is supplied from the cell conversion section 13, the input FIFO buffer 115 outputs each word of the cell to the cell conversion section 13.

Figure 5:
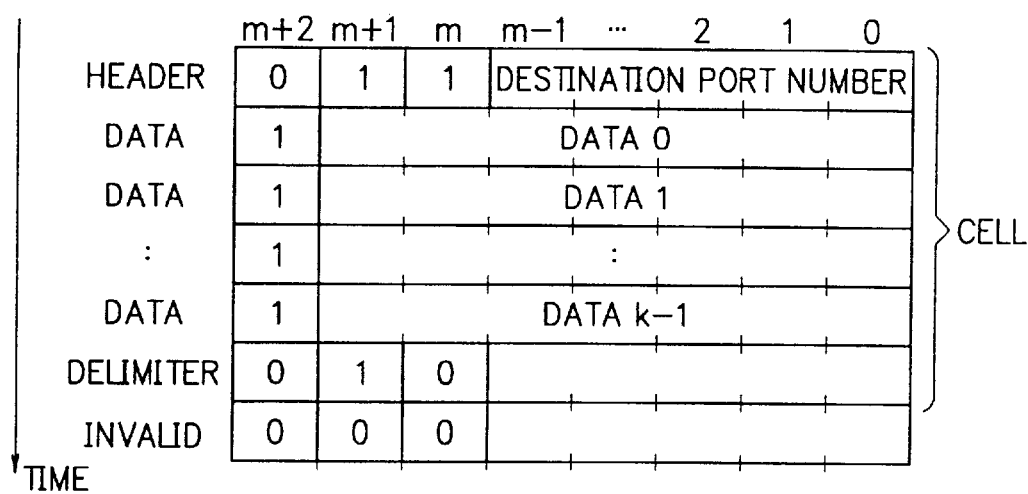
FIG. 5 is a schematic diagram showing an example of the format of a transaction cell which is transferred in the bus switch of FIG. 1.

FIG. 5 is a schematic diagram showing an example of the format of the transaction cell. Referring to FIG. 5, the transaction cell is composed of a header (1 word), data (k words following the header), and a delimiter (1 word). Each word is composed of m+3 bits. A word whose most significant bit (the bit m+2 shown in FIG. 5) is "1" is data, and a word whose most significant bit is "0" is not data. A word is a header if the most significant 3 bits of the word (the bit m+2, the bit m+1 and the bit m shown in FIG. 5) are "011", and a word is a delimiter if the most significant 3 bits of the word are "010". The least significant m bits of the cell header indicate a destination port number, that is, a port number of a port of the switch module 2 to which the transaction cell should be transferred. When the most significant 3 bits of a word are "000", the word is an invalid word which is not included in a transaction cell.

Figure 6:
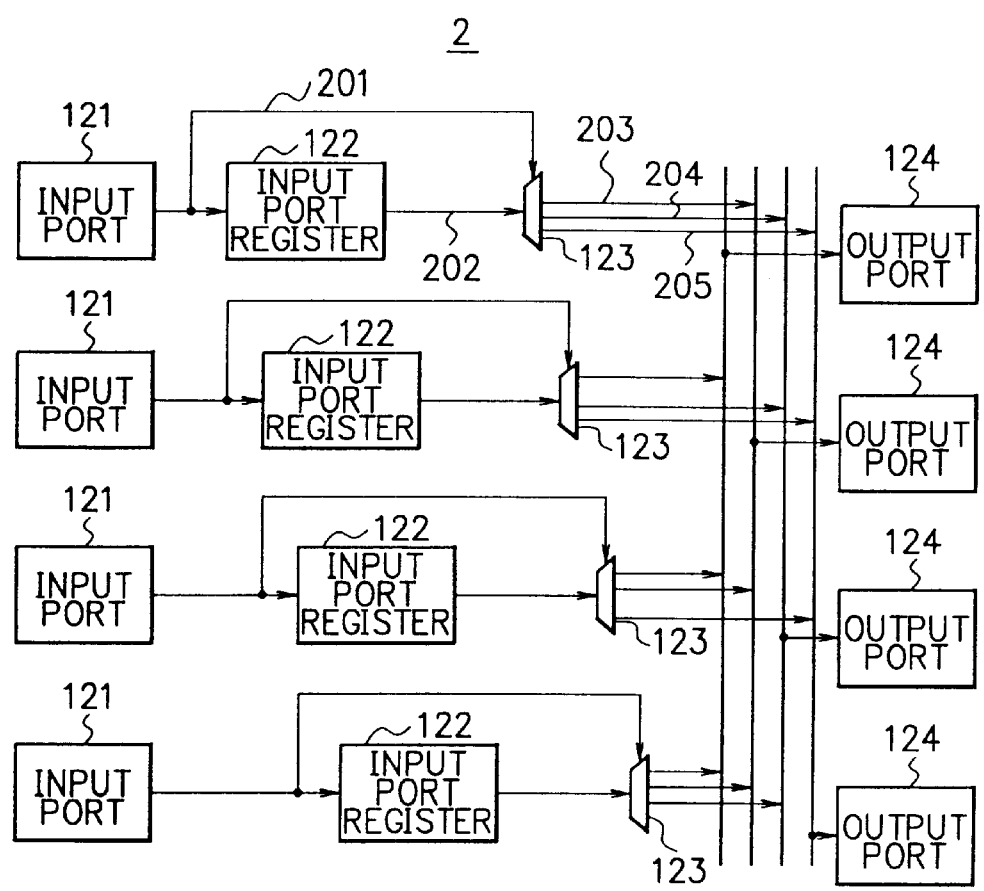
FIG. 6 is a block diagram showing an example of internal composition of the switch module which transfers the transaction cell of FIG. 5 from one of its input ports to one of its output ports.

FIG. 6 is a block diagram showing an example of internal composition of the switch module 2 which transfers the transaction cell of FIG. 5 from one of its input ports to one of its output ports. Referring to FIG. 6, a cell which is supplied to the switch module 2 is inputted to one of the input ports 121. Each word of the cell is inputted to a corresponding input port register 122 one by one. Meanwhile, necessary bits in the word are supplied to a corresponding output port multiplexer 123 as an output port multiplexer control signal 201. The output port multiplexer 123 is controlled depending on the value of the output port multiplexer control signal 201, and outputs each word 202, which has been delayed by one clock cycle by the input port register 122 and supplied to the output port multiplexer 123, to one of the output ports 124 which is designated by the output port multiplexer control signal 201. The cell which has been transferred to the output port 124 is transmitted to a bus bridge 1 that corresponds to the output port 124. By the composition which has been described above, transfer of each cell in the switch module 2 can be executed without direct control by the scheduler 3.

FIG. 7 is a table showing an example of the correspondence between the input and the output of the output port multiplexer 123, in the case where the transaction cell has the format which has been shown in FIG. 5 and m (the number of bits of the destination port number)=2. Referring to FIG. 7, the output port multiplexer control signal 201, which is the control input to the output port multiplexer 123, is composed of 5 bits. The 5 bits are composed of the most significant 3 bits of the word (word type identification bits) and the least significant 2 bits of the word. In the case where the output port multiplexer control signal 201 is "01100" in binary notation, the first output 203, the second output 204 and the third output 205 of the output port multiplexer 123 are all high impedance. In the case where the output port multiplexer control signal 201 is "01101", the second output 204 and the third output 205 of the output port multiplexer 123 are high impedance, and the first output 203 is the word 202. In the case where the output port multiplexer control signal 201 is "01110", the first output 203 and the third output 205 are high impedance, and the second output 204 is the word 202. And in the case where the output port multiplexer control signal 201 is "01111", the first output 203 and the second output 204 are high impedance, and the third output 205 is the word 202. In the case where the most significant bit of the output port multiplexer control signal 201 is "1", the first output 203, the second output 204 and the third output 205 are not changed regardless of the other bits of the output port multiplexer control signal 201. Therefore, in the case where the output port multiplexer control signal 201 changed from "01111" to "11111" for example, the first output 203 and the second output 204 remains high impedance, and the third output 205 remains the word 202.

As described above, in the bus switch according to the first embodiment of the present invention, a destination port number is added to a transaction cell when the transaction cell is generated and outputted by a bus bridge 1. When the transaction cell is inputted to the switch module 2 via an input port 121, the output port multiplexer 123 corresponding to the input port 121 is controlled depending on the destination port number which has been included in the transaction cell, thereby the transaction cell is transferred to an output port 124 that is designated by the destination port number, and thus the transaction cell is transferred to a bus bridge 1 which has been designated by the destination port number. Therefore, the scheduler 3 does not have to directly control connection of a transfer path in the switch module 2. Consequently, the scheduler 3 and the switch module 2 do not have to be connected together via lines, and thus the scheduler 3 and the switch module 2 can be formed in separate and independent two LSIs. Therefore, the number of buses 4 connected to the bus switch can be increased easier in comparison with conventional bus switches.

Incidentally, the format of the transaction cell is not limited to the cell format which has been shown in FIG. 5, and it is clear that the effects of the first embodiment can also be obtained even if the transaction cell has other type of a format, as long as discrimination between a cell header, data, a delimiter and an invalid word can be done according to the format and the format can be accommodated in a feasible number of bits and the header can contain information with respect to the destination port number.

In the following, a second embodiment of the present invention will be described referring to FIGS. 8 and 9.

Figure 8:
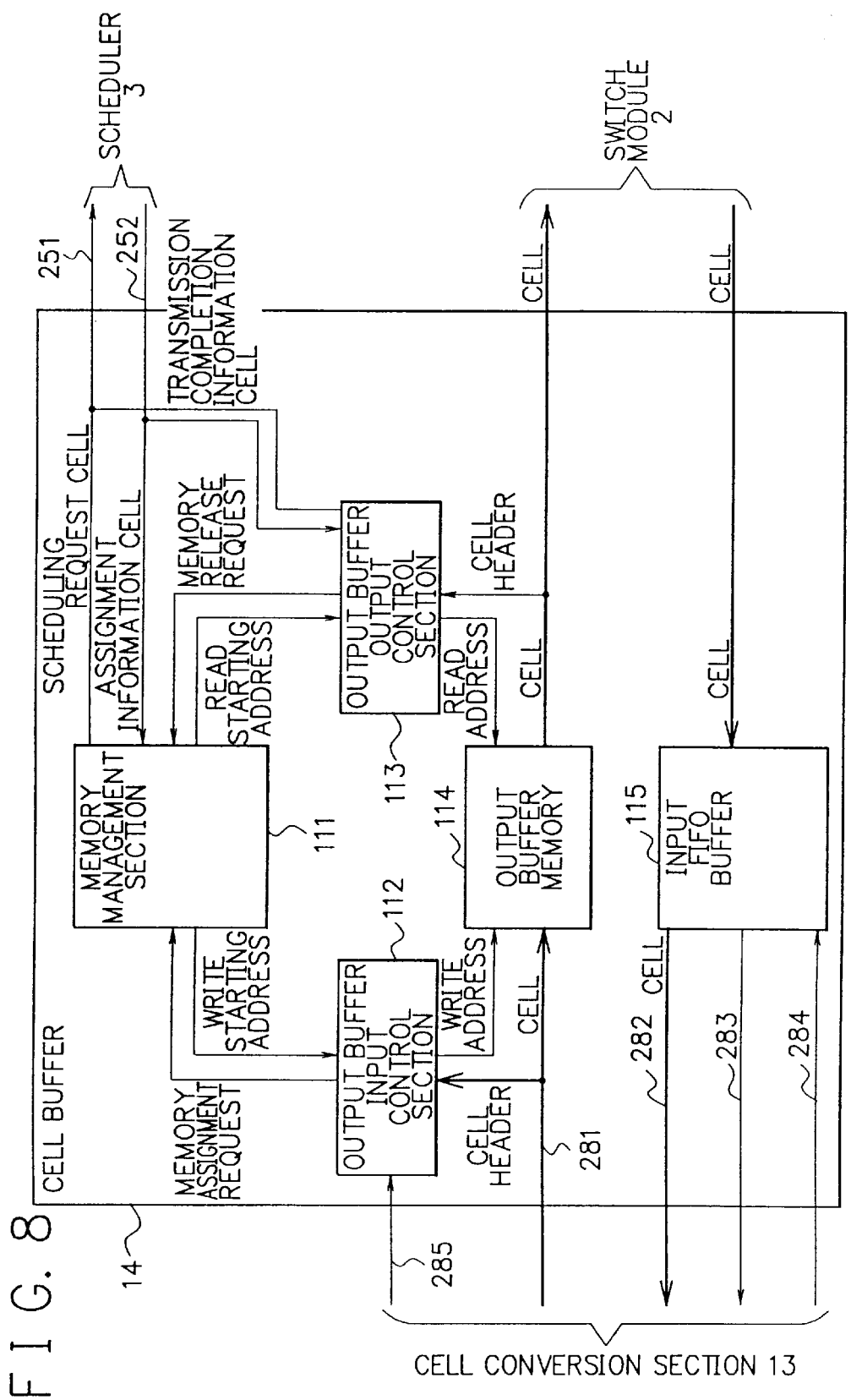
FIG. 8 is a block diagram showing a cell buffer which is included in a bus switch according to a second embodiment of the present invention.

FIG. 8 is a block diagram showing a cell buffer 14 which is included in a bus switch according to the second embodiment of the present invention. The bus switch of the second embodiment is realized by replacing the cell buffer 14 of the first embodiment with the cell buffer 14 which is shown in FIG. 8. In other words, a bus bridge 1 in the bus switch of the second embodiment includes the cell buffer 14 of FIG. 8 in place of the cell buffer 14 of FIG. 4. In the cell buffer 14 of FIG. 8, the output buffer output control section 113 sends a transmission completion information cell to the scheduler 3 at the completion of cell transmission from the output buffer memory 114.

Figure 9:
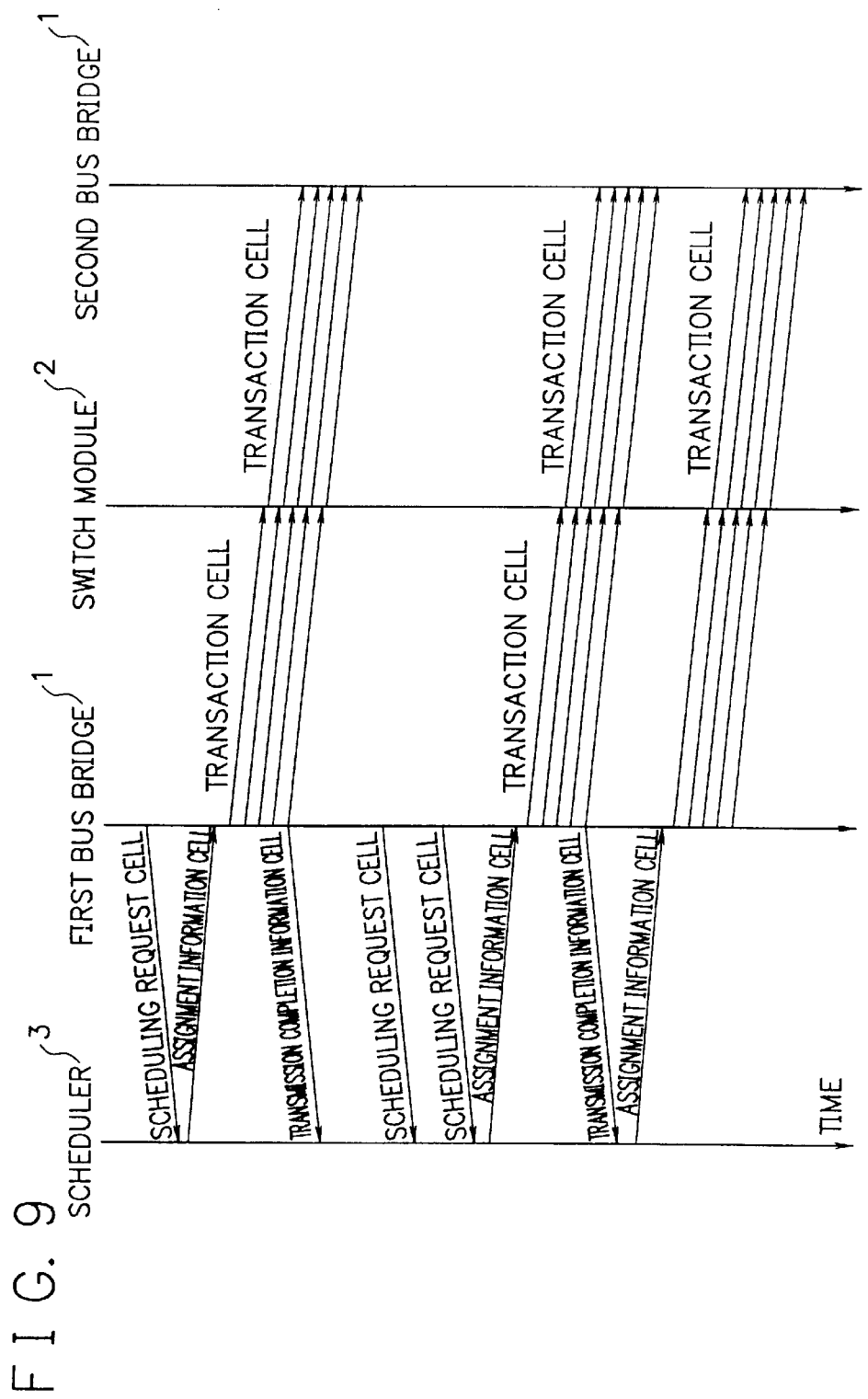
FIG. 9 is a schematic diagram showing the operation of the bus switch of the second embodiment.

FIG. 9 is a schematic diagram showing the operation of the bus switch of the second embodiment. Referring to FIG. 9, first, a first bus bridge 1 sends the scheduling request cell to the scheduler 3. The scheduler 3 which received the scheduling request cell judges whether or not a transfer path requested by the scheduling request cell is assignable, and sends the assignment information cell to the first bus bridge 1 if the transfer path is judged to be assignable. The first bus bridge 1 which received the assignment information cell sends a transaction cell to the switch module 2. The switch module 2 transfers the transaction cell to a second bus bridge 1 which has been designated by the destination port number which is included in the header of the transaction cell.

The first bus bridge 1 also sends the transmission completion information cell to the scheduler 3 on transmission of the final word of the transaction cell, and thereby informs the scheduler 3 about completion of transmission of the transaction cell by the bus bridge 1 (i.e. about completion of transfer of the transaction cell by the switch module 2).

By the operation described above, collision between transaction cells in the switch module 2 can be avoided, without needing communication between the switch module 2 and the scheduler 3.

As described above, in the bus switch according to the second embodiment of the present invention, when a first bus bridge 1 which generated a cell transmits the cell to a second bus bridge 1 via the switch module 2, the first bus bridge 1 transmits the transmission completion information cell to the scheduler 3 at the completion of cell transmission and thereby informs the scheduler 3 about completion of cell transfer via the switch module 2. The switch module 2 does not have to execute request for the next scheduling to the scheduler 3, and thus the scheduler 3 and the switch module 2 do not have to be connected together via lines. Timing for transmitting the final word of a cell is predictable and is grasped by a bus bridge 1, therefore, by appropriately setting timing for transmitting the transmission completion information cell from the bus bridge 1, the scheduler 3 can start assignment of the next transfer path in the switch module 2 with minimum delay after the bus bridge 1 completed cell transmission. Therefore, the availability of the switch module 2 can be raised and the throughput of the bus switch can be increased.

In the following, a third embodiment of the present invention will be described referring to FIG. 10 through FIG. 13.

Figure 10:
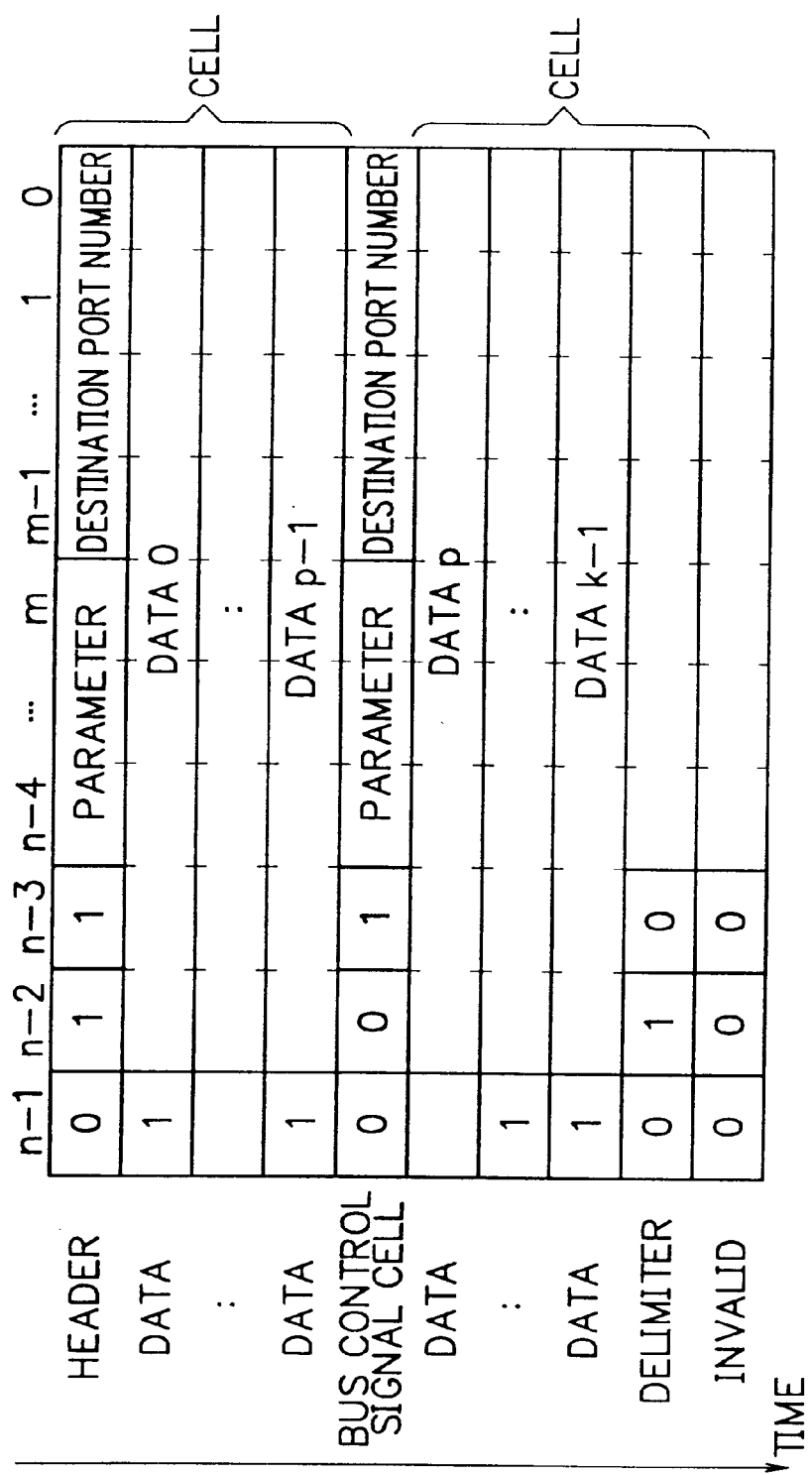
FIG. 10 is a schematic diagram showing a time sequence of words which is realized by a bus switch according to a third embodiment of the present invention, in which a bus control signal cell is inserted in a transaction cell by use of word type identification bits.

FIG. 10 is a schematic diagram showing a time sequence of words which is realized by the third embodiment, in which a bus control signal cell is inserted in a transaction cell by use of word type identification bits. Referring to FIG. 10, the most significant 3 bits of each word are used as word type identification bits. The word type identification bits are used in order to identify the type of each word. In FIG. 10, the most significant 3 bits "011" of a word show that the word is a header, the most significant 3 bits "010" of a word show that the word is a delimiter, the most significant 3 bits "001" of a word show that the word is a bus control signal cell, and the most significant 3 bits "000" of a word show that the word is an invalid word. On the other hand, the most significant bit "1" of a word shows that the word is data.

Figure 11:
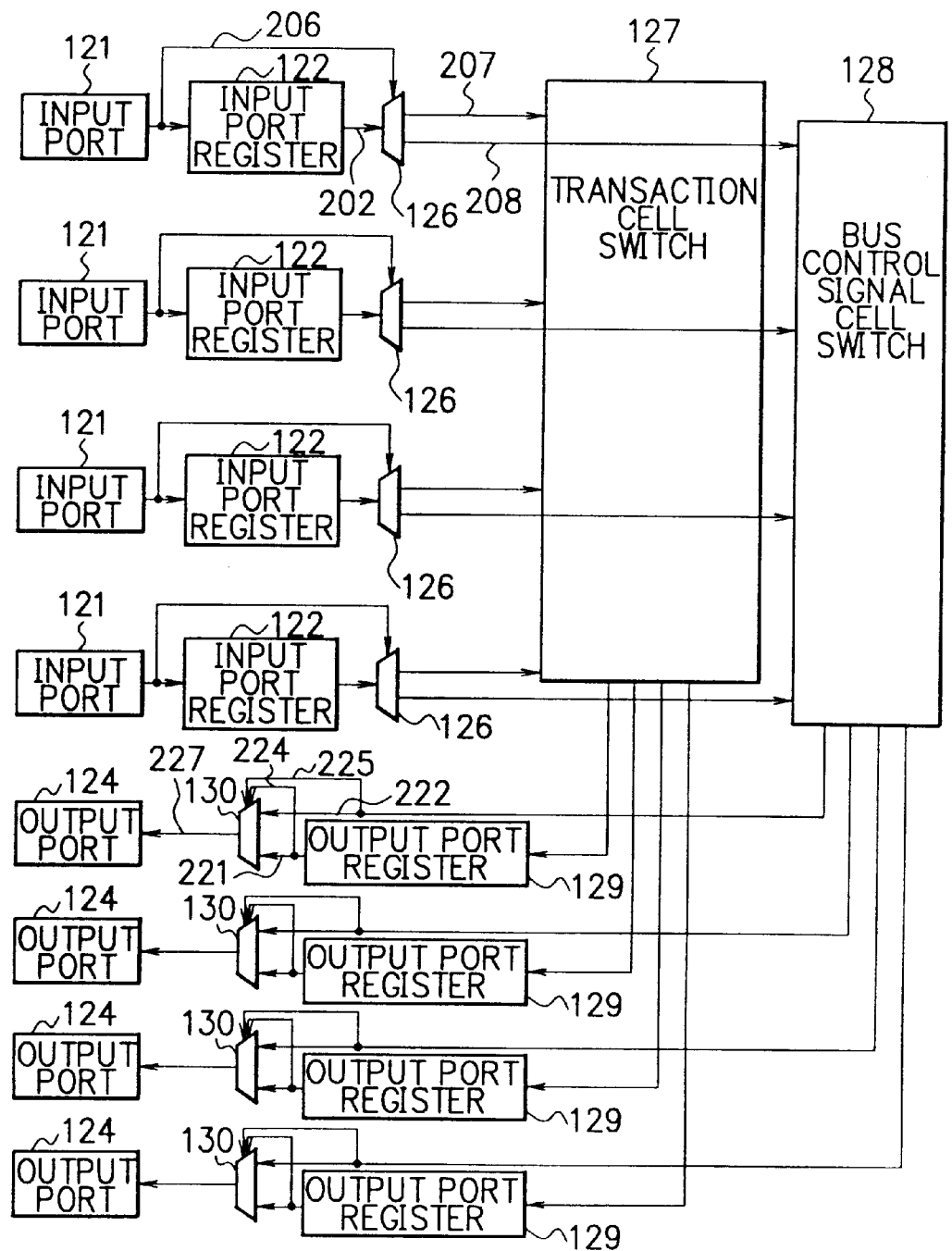
FIG. 11 is a block diagram showing an example of internal composition of a switch module which transfers the transaction cell and the bus control signal cell of FIG. 10 from one of its input ports to one of its output ports.

FIG. 11 is a block diagram showing an example of internal composition of a switch module 2 which transfers the transaction cell and the bus control signal cell shown in FIG. 10 from one of its input ports to one of its output ports. Referring to FIG. 11, a cell which is supplied to the switch module 2 is inputted to one of the input ports 121. Each word of the cell is inputted to a corresponding input port register 122 one by one. Meanwhile, word type identification bits in each word are supplied to a corresponding switch multiplexer 126 as a switch multiplexer control signal 206. The switch multiplexer 126 is controlled depending on the value of the switch multiplexer control signal 206, and transfers each word 202, which has been delayed by one clock cycle by the input port register 122 and supplied to the switch multiplexer 126, to a transaction cell switch 127 or a bus control signal cell switch 128 depending on the switch multiplexer control signal 206. The transaction cell which has been transferred to the transaction cell switch 127 is transferred to an output port register 129 that corresponds to a destination output port 124 (i.e. an output port 124 that is designated by a destination port number in the transaction cell).

A bus control signal cell which has been transferred to the bus control signal cell switch 128 is transferred to an output port selector 130 that is connected to a destination output port 124 (i.e. an output port 124 that is designated by a destination port number in the bus control signal cell). Word type identification bits of the bus control signal cell are inputted to the output port selector 130 as a second control signal 225. Output of the output port register 129 (i.e. each word of the transaction cell) is supplied to the output port selector 130, and word type identification bits of each word of the transaction cell are inputted to the output port selector 130 as a first control signal 224.

The output port selector 130 selects and outputs the bus control signal cell in the case where a valid bus control signal cell is supplied thereto, and otherwise, selects and outputs the output of the output port register 129 (i.e. words of the transaction cell), as will be described later. The cell which has been transferred to the destination output port 124 is transmitted to a bus bridge 1 that corresponds to the output port 124. By the composition which has been described above, bus control signal cells can be inserted in a transaction cell.

FIG. 12 is a table showing the correspondence between the input and the output of the switch multiplexer 126, in the case where the word type identification bits which have been shown in FIG. 10 are employed. Referring to FIG. 12, the switch multiplexer control signal 206, which is the control input to the switch multiplexer 126, is composed of the most significant 3 bits of each word (the word type identification bits). In the case where the switch multiplexer control signal 206 is "000" in binary notation (i.e. in the case where the word is an invalid word), the first output 207 and the second output 208 of the switch multiplexer 126 are both high impedance. In the case where the switch multiplexer control signal 206 is "001" (i.e. in the case where the word is a bus control signal cell), the first output 207 is high impedance and the second output 208 is the word 202. In the case where the switch multiplexer control signal 206 is "010" or "011" (i.e. in the case where the word is a delimiter or a header of a transaction cell), the first output 207 is the word 202 and the second output 208 is high impedance. In the case where the most significant bit of the switch multiplexer control signal 206 is "1" (i.e. in the case where the word is data), the first output 207 is the word 202 and the second output 208 is high impedance.

FIG. 13 is a table showing the correspondence between the input and the output of the output port selector 130. Referring to FIG. 13, the first control signal 224 is the most significant 3 bits of each word that is outputted by the output port register 129, and the second control signal 225 is the most significant 4 bits of each word that is outputted by the bus control signal cell switch 128. In the case where the second control signal 225 is "0010", the output port selector 130 outputs a bus control signal word 222 (the output of the bus control signal cell switch 128) as an output port selector output signal 227, regardless of the value of the first control signal 224. In the case where the second control signal 225 is "0000" and the first control signal 224 is "011" or "010", the output port selector 130 outputs a transaction word 221 (the output of the output port register 129: a header or a delimiter) as the output port selector output signal 227. Also in the case where the second control signal 225 is "0000" and the most significant bit of the first control signal 224 is "1", the output port selector 130 outputs a transaction word 221 (the output of the output port register 129: data) as the output port selector output signal 227. In the case where the second control signal 225 is "0000" and the first control signal 224 is "000", the output port selector 130 outputs an invalid word as the output port selector output signal 227.

As described above, in the bus switch according to the third embodiment of the present invention, when the bus bridge 1 generates a cell, the bus bridge 1 adds word type identification bits for indicating the type of a word to each word of a cell. By the word type identification bits, the switch module 2 can judge whether a word is part of a transaction cell or a bus control signal cell. By use of the word type identification bits, bus control signal cells can be inserted in a transaction cell. Therefore, the bus bridge 1 can transmit a bus control signal cell before completion of transmission of a transaction cell, and thus a bus control signal (i.e. an interrupt signal, an error signal, etc) can be transferred faster in the bus switch. Consequently, operations concerning interrupt, abnormal end (ABEND), etc. can be executed faster.

Further, the above effects can be obtained without providing two separate lines (a line for transferring the transaction cells and a line for transferring the bus control signal cells) between the bus bridge 1 and the switch module 2.

Incidentally, the format of the word type identification bits which has been described above is only an example. It is clear that the same effects can be obtained by other type of formats as long as discrimination between a header of a transaction cell, data of a transaction cell, a delimiter of a transaction cell, an invalid word and a bus control signal word (cell) can be done according to the format.

In addition, while the bus control signal cell which has been described above was composed of one word, it is also possible to let the bus bridge 1 generate a bus control signal cell composed of N words (N: a fixed integer larger than 1). In such cases, at least the first word of the bus control signal cell has to contain the word type identification bits.

In the following, a fourth embodiment of the present invention will be described referring to FIG. 14 through FIG. 17.

FIG. 14 is a schematic diagram showing a time sequence of words which is realized by the fourth embodiment, in which a bus control signal cell and a scheduling request cell are inserted in a transaction cell by use of the word type identification bits. Referring to FIG. 14, the most significant 4 bits of each word are used as the word type identification bits in the fourth embodiment. In FIG. 14, the most significant bit "1" of a word shows that the word is data, and the most significant bit "0" of a word shows that the word is a header, a delimiter, a bus control signal cell, a scheduling request cell or an invalid word. The most significant 3 bits "011" of a word show that the word is a header, the most significant 3 bits "010" of a word show that the word is a delimiter, the most significant 3 bits "000" of a word show that the word is an invalid word, and the most significant 3 bits "001" of a word show that the word is a bus control signal cell or a scheduling request cell. In the last case, a word is a bus control signal cell if the most significant 4 bits of the word is "0010", and a word is a scheduling request cell if the most significant 4 bits of the word is "0011".

FIG. 15 is a block diagram showing an example of internal composition of a switch module 2 which transfers the transaction cell, the bus control signal cell and the scheduling request cell shown in FIG. 14 from one of its input ports to one of its output ports. Referring to FIG. 15, a cell which is supplied to the switch module 2 is inputted to one of the input ports 121. Each word of the cell is inputted to a corresponding input port register 122 one by one. Meanwhile, the word type identification bits (the most significant 4 bits of each word) are supplied to a corresponding switch multiplexer 126 as a switch multiplexer control signal 206. The switch multiplexer 126 is controlled depending on the value of the switch multiplexer control signal 206, and transfers each word 202, which has been delayed by one clock cycle by the input port register 122 and supplied to the switch multiplexer 126, to a transaction cell switch 127, a bus control signal cell switch 128 or the scheduler 3 depending on the switch multiplexer control signal 206. The transaction cell which has been transferred to the transaction cell switch 127 is transferred to an output port register 129 that corresponds to a destination output port 124 which is designated by the destination port number included in the transaction cell.

A bus control signal cell which has been transferred to the bus control signal cell switch 128 is transferred to a bus control signal register 131 that corresponds to a destination output port 124 which is designated by the destination port number included in the bus control signal cell.

The output port register 129 stores each word of the transaction cell one by one and outputs each word in the order of input. When no word is stored in the output port register 129, the output port register 129 outputs an invalid word.

The bus control signal register 131 stores each word of the bus control signal cell one by one and outputs each word in the order of input. When no word is stored in the bus control signal register 131, the bus control signal register 131 outputs an invalid word.

The output port selector 130 is supplied with outputs of the output port register 129, the bus control signal register 131 and the scheduler 3. The output port selector 130 is also supplied with word type identification bits of a word that is going to be outputted by the output port register 129 next, word type identification bits of a word that is going to be outputted by the bus control signal register 131 next, and word type identification bits of a word that is going to be outputted by the scheduler 3 next, as a first control signal 224, a second control signal 225 and a third control signal 226, respectively.

The output port selector 130, which is controlled by the first control signal 224, the second control signal 225 and the third control signal 226, selects and outputs the output of the output port register 129, the output of the bus control signal register 131 or the output of the scheduler 3 to a corresponding output port 124 as the output port selector output signal 227, as will be described later. The output port selector output signal 227 supplied to the output port 124 is transmitted to a bus bridge 1 that corresponds to the output port 124. By the composition which has been described above, bus control signal cells and scheduling request cells can be inserted in a transaction cell.

FIG. 16 is a table showing the correspondence between the input and the output of the switch multiplexer 126 of the fourth embodiment, in the case where the word type identification bits which has been shown in FIG. 14 are used. Referring to FIG. 16, the switch multiplexer control signal 206, which is the control input to the switch multiplexer 126, is composed of the most significant 4 bits of each word (the word type identification bits). In the case where the most significant 3 bits of the switch multiplexer control signal 206 are "000" in binary notation, the first output 207, the second output 208 and the third output 209 of the switch multiplexer 126 are all high impedance. In the case where the switch multiplexer control signal 206 is "0010" (i.e. in the case where the word is a bus control signal cell), the first output 207 and the third output 209 are high impedance and the second output 208 is the word 202. In the case where the switch multiplexer control signal 206 is "0011" (i.e. in the case where the word is a scheduling request cell), the first output 207 and the second output 208 are high impedance and the third output 209 is the word 202. In the case where the most significant 2 bits of the switch multiplexer control signal 206 are "01", the first output 207 is the word 202 and the second output 208 and the third output 209 are high impedance. Also in the case where the most significant bit of the switch multiplexer control signal 206 is "1", the first output 207 is the word 202 and the second output 208 and the third output 209 are high impedance.

FIG. 17 is a table showing the correspondence between the input and the output of the output port selector 130 of the fourth embodiment. Referring to FIG. 17, the first control signal 224 is the most significant 3 bits of each word that is outputted by the output port register 129, and the second control signal 225 is the most significant 4 bits of each word that is outputted by the bus control signal cell switch 128, and the third control signal 226 is the most significant 4 bits of each word that is outputted by the scheduler 3. In the case where the third control signal 226 is "0011", the output port selector 130 outputs a scheduling word 223 as the output port selector output signal 227. In the case where the third control signal 226 is "0000" and the second control signal 225 is "0010", the output port selector 130 outputs a bus control signal word 222 as the output port selector output signal 227. In the case where the third control signal 226 and the second control signal 225 are both "0000" and the most significant 2 bits of the first control signal 224 are "01", the output port selector 130 outputs a transaction word 221 as the output port selector output signal 227. Also in the case where the third control signal 226 and the second control signal 225 are both "0000" and the most significant bit of the first control signal 224 is "1", the output port selector 130 outputs a transaction word 221 as the output port selector output signal 227. In the case where the third control signal 226 and the second control signal 225 are both "0000" and the first control signal 224 is "000", the output port selector 130 outputs an invalid word as the output port selector output signal 227.

As described above, in the bus switch according to the fourth embodiment of the present invention, the bus bridge 1 can insert a scheduling request cell in a transaction cell, by using the word type identification bits. Therefore, the bus bridge 1 can transmit a scheduling request cell before completion of transmission of a transaction cell, and thus the scheduling request cell can be transferred faster between the bus bridge 1 and the scheduler 3. Consequently, the availability of the switch module 2 can be raised and the throughput of the bus switch can be increased.

Incidentally, the format of the word type identification bits which has been described above is only an example. It is clear that the same effects can be obtained by other type of formats as long as discrimination between a header of a transaction cell, data of a transaction cell, a delimiter of a transaction cell, an invalid word, a bus control signal cell and a scheduling cell can be done according to the format.

In addition, while the scheduling cell which has been described above was composed of one word, it can also be composed of N words (N: a fixed integer larger than 1). In such cases, at least the first word of the scheduling cell has to contain the word type identification bits.

Figure 18:
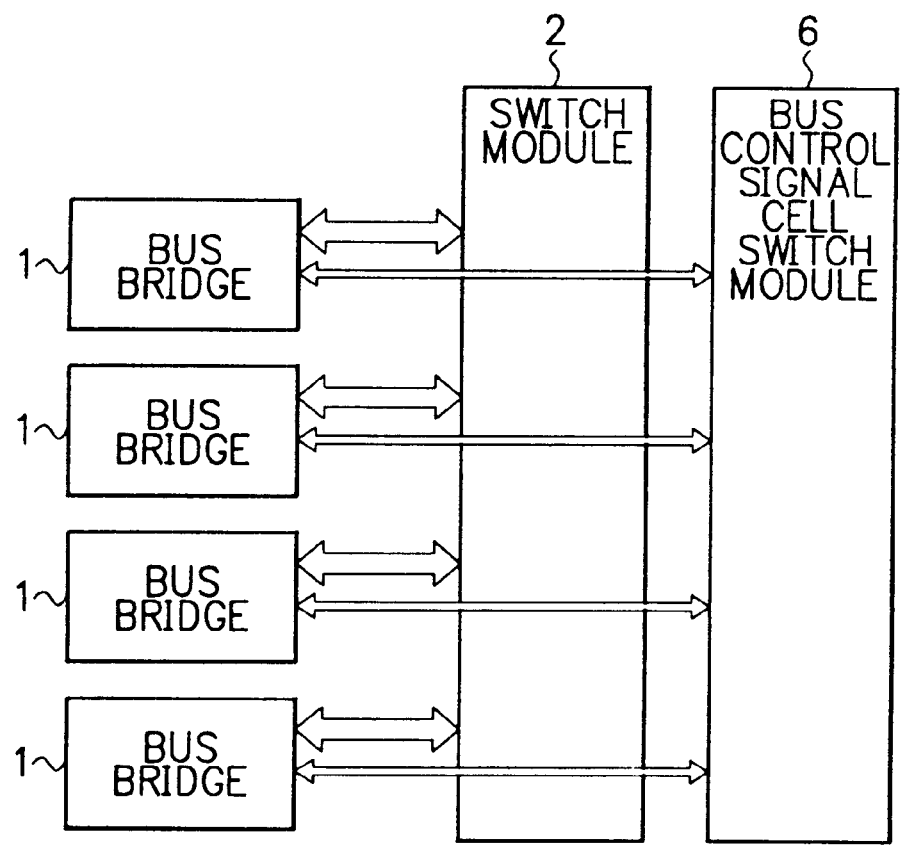
FIG. 18 is a block diagram showing a bus switch according to a fifth embodiment of the present invention.

FIG. 18 is a block diagram showing a bus switch according to a fifth embodiment of the present invention. Incidentally, the scheduler 3 and the buses 4 are not drawn in FIG. 18 for brevity. Referring to FIG. 18, the bus switch of the fifth embodiment further comprises a bus control signal cell switch module 6. The bus control signal cell switch module 6 is a module specifically designed for executing switching for the bus control signal cells. Each bus bridge 1 is connected to the bus control signal cell switch module 6 via a separate line. By the composition shown in FIG. 18, transfer of the bus control signal cells can be executed concurrently with transfer of the transaction cells and the scheduling request cells, and thus high speed transfer of the bus control signal cells can be realized.

Figure 19:
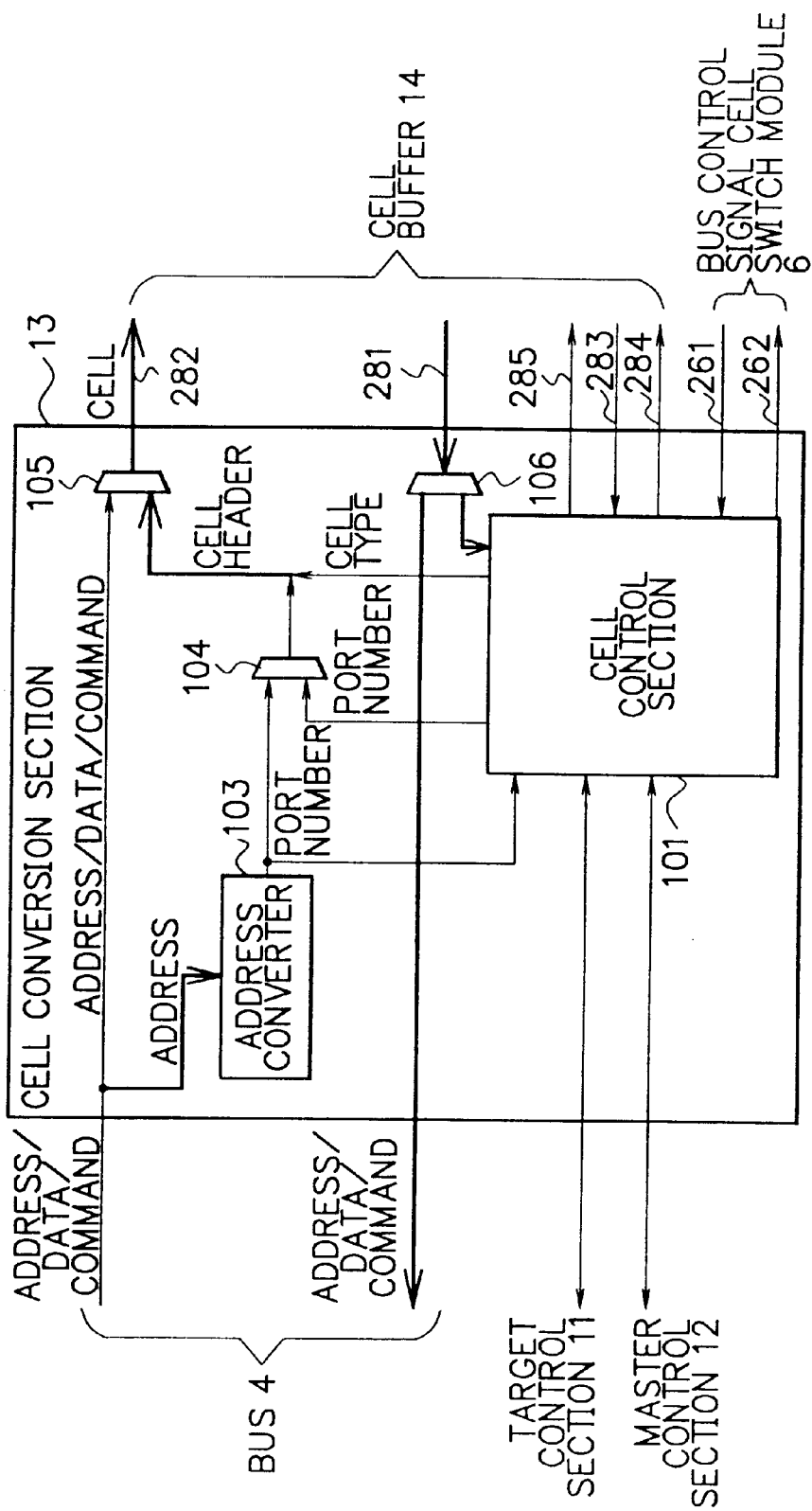
FIG. 19 is a block diagram showing an example of internal composition of a cell conversion section in the bus bridge which is shown in FIG. 18.

FIG. 19 is a block diagram showing an example of internal composition of a cell conversion section 13 in the bus bridge 1 which is shown in FIG. 18. Referring to FIG. 19, the cell control section 101 converts a bus control signal (an interrupt signal, an error signal, etc.) which has been transmitted by a device on the bus 4 into a bus control signal cell 262, and transmits the bus control signal cell 262 to the bus control signal cell switch module 6. Meanwhile, the cell control section 101 converts bus control signal cells 261 which are supplied from the bus control signal cell switch module 6 into bus control signals, and outputs bus control signals to the bus 4 by driving the target control section 11 or the master control section 12.

As described above, in the bus switch according to the fifth embodiment of the present invention, the bus control signal cell switch module 6 is provided specifically for transferring bus control signal cells. The bus bridge 1 and the bus control signal cell switch module 6 are connected by a special-purpose line which specifically transfers the bus control signal cells. The transaction cells and the bus control signal cells are transferred via different lines, therefore, traffic on the line between the bus bridge 1 and the switch module 2 is not affected by the transfer of the bus control signal cell between the bus bridge 1 and the bus control signal cell switch module 6. Therefore, deterioration of transfer throughput and latency of transaction cells in the bus switch due to transfer of bus control signal cells can be avoided. Further, delay in transfer of bus control signal cells due to transfer of transaction cells can also be avoided, and thus transfer of the bus control signal cells can be speeded up.

Incidentally, it is also possible to store the transaction cells and the bus control signal cells in one cell buffer 14 before transmitting the cells to the switch module 2 or the bus control signal cell switch module 6, and transmit the transaction cells and the bus control signal cells in order of input, in order to keep the order of the cells.

Figure 20:
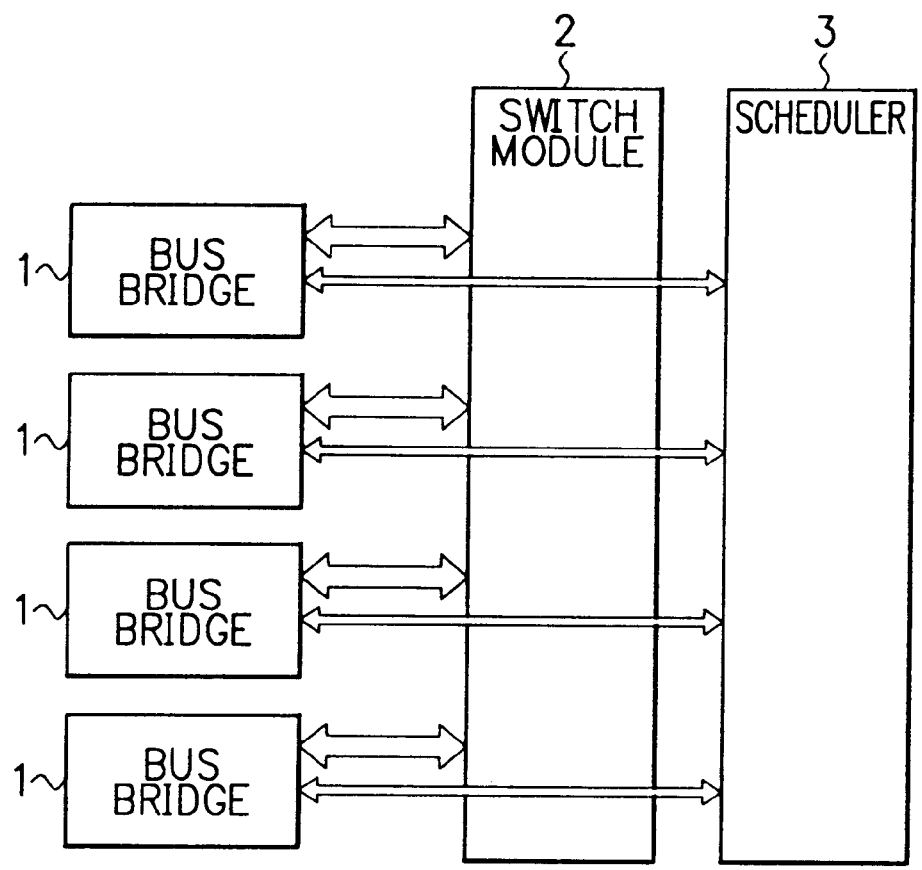
FIG. 20 is a block diagram showing a bus switch according to a sixth embodiment of the present invention.

FIG. 20 is a block diagram showing a bus switch according to a sixth embodiment of the present invention. Referring to FIG. 20, each bus bridge 1 is provided with separate two lines: a line connecting the bus bridge 1 and the switch module 2 and a line connecting the bus bridge 1 and the scheduler 3. The line connecting the bus bridge 1 and the scheduler 3 is a scheduling cell line which is specifically used for transferring scheduling cells (the scheduling request cell and the assignment information cell) between the bus bridge 1 and the scheduler 3. The scheduling cell line is connected to the memory management section 111 of the cell buffer 14 of the bus bridge 1.

As described above, in the bus switch according to the sixth embodiment of the present invention, a scheduling cell line which is specifically used for transferring the scheduling cells is provided between the bus bridge 1 and the scheduler 3. The transaction cells and the scheduling cells are transferred via different lines, and thus transfer of the scheduling cells does not affect the traffic on the line between the bus bridge 1 and the switch module 2. Therefore, deterioration of transfer throughput of the transaction cells in the switch module 2 due to transfer of the scheduling cells can be avoided, and increase of latency of the transaction cells in the bus switch can be prevented. Further, transfer of the scheduling cells can be executed faster without delayed by the transaction cells.

Figure 21:
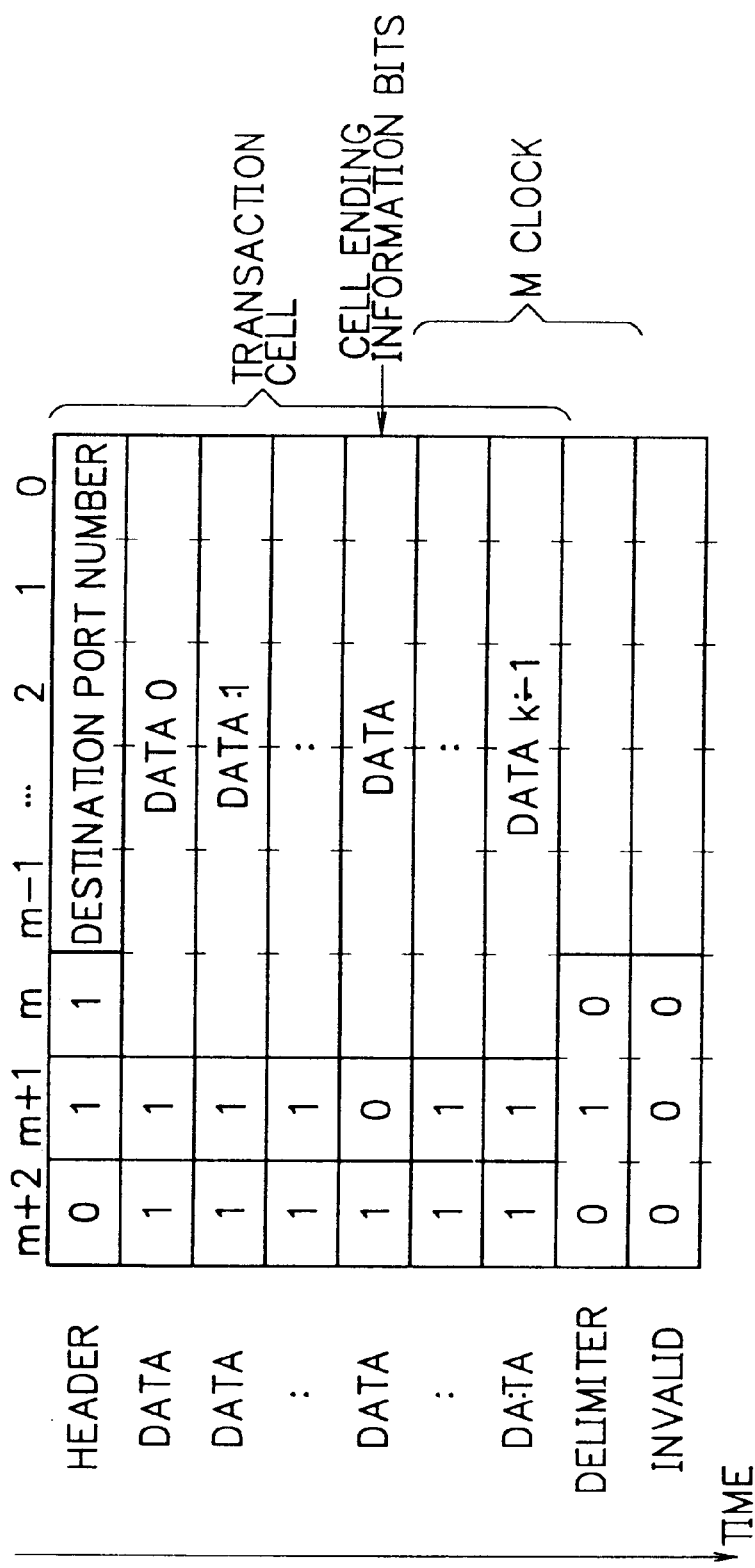
FIG. 21 is a schematic diagram showing an example of the format of a transaction cell which is employed in a bus switch according to a seventh embodiment of the present invention.

FIG. 21 is a schematic diagram showing an example of the format of a transaction cell which is employed in a bus switch according to a seventh embodiment of the present invention. Referring to FIG. 21, the most significant 2 bits "11" of a word shows that the word is data. The most significant 2 bits "10" of a word shows that the word is data and the transaction cell in which the word is included will end after M clock cycles (cell ending information bits). The scheduler 3 in the seventh embodiment monitors transmission of cells from the bus bridges 1 to the switch module 2, and thereby monitors the cell ending information bits. By such a format of the transaction cell, the bus bridge 1 can inform the switch module 2 and the scheduler 3 that transfer of a transaction cell transmitted by the bus bridge 1 will be over in M clock cycles.

As described above, in the bus switch according to the seventh embodiment of the present invention, the bus bridge 1 adds cell ending information bits to a word of a transaction cell, and thereby lets the scheduler 3 know that transfer of the transaction cell will be over a predetermined number of words later. By adequately setting the predetermined number, delay time between completion of transaction cell transfer in the switch module 2 and the next scheduling by the scheduler 3 can be considerably shortened. Therefore, the availability of the switch module 2 can be raised and the throughput of the bus switch can be increased.

Figure 22:
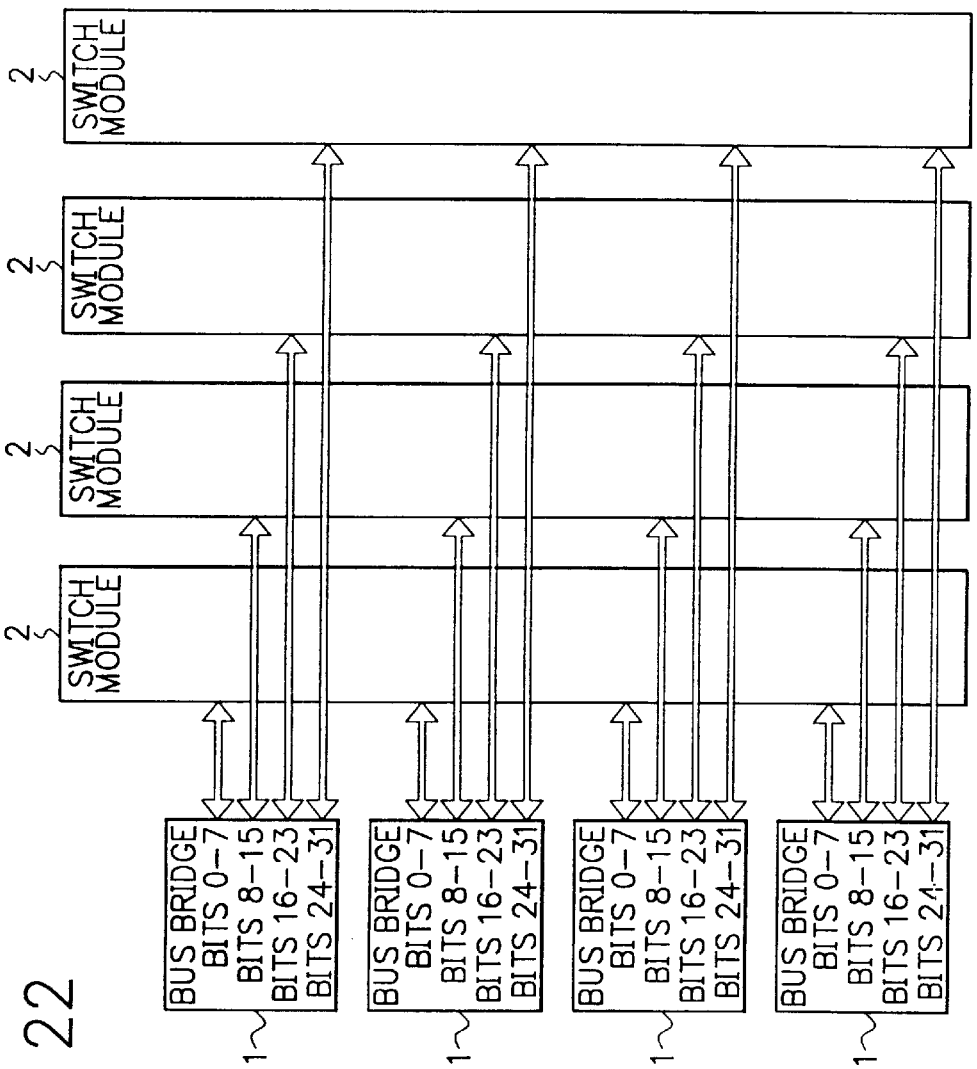
FIG. 22 is a block diagram showing a bus switch according to an eighth embodiment of the present invention.

FIG. 22 is a block diagram showing a bus switch according to an eighth embodiment of the present invention. Referring to FIG. 22, the bus switch of the eight embodiment includes four switch modules 2. Incidentally, the scheduler 3 and the buses 4 are not drawn in FIG. 22 for brevity. In the bus switch of FIG. 22, four lines are used in order to connect a bus bridge 1 and the 4 switch modules 2. Therefore, bit width of a line between the bus bridge 1 and a switch module 2 becomes ¼ in comparison with a line in the first embodiment.

Figure 23:
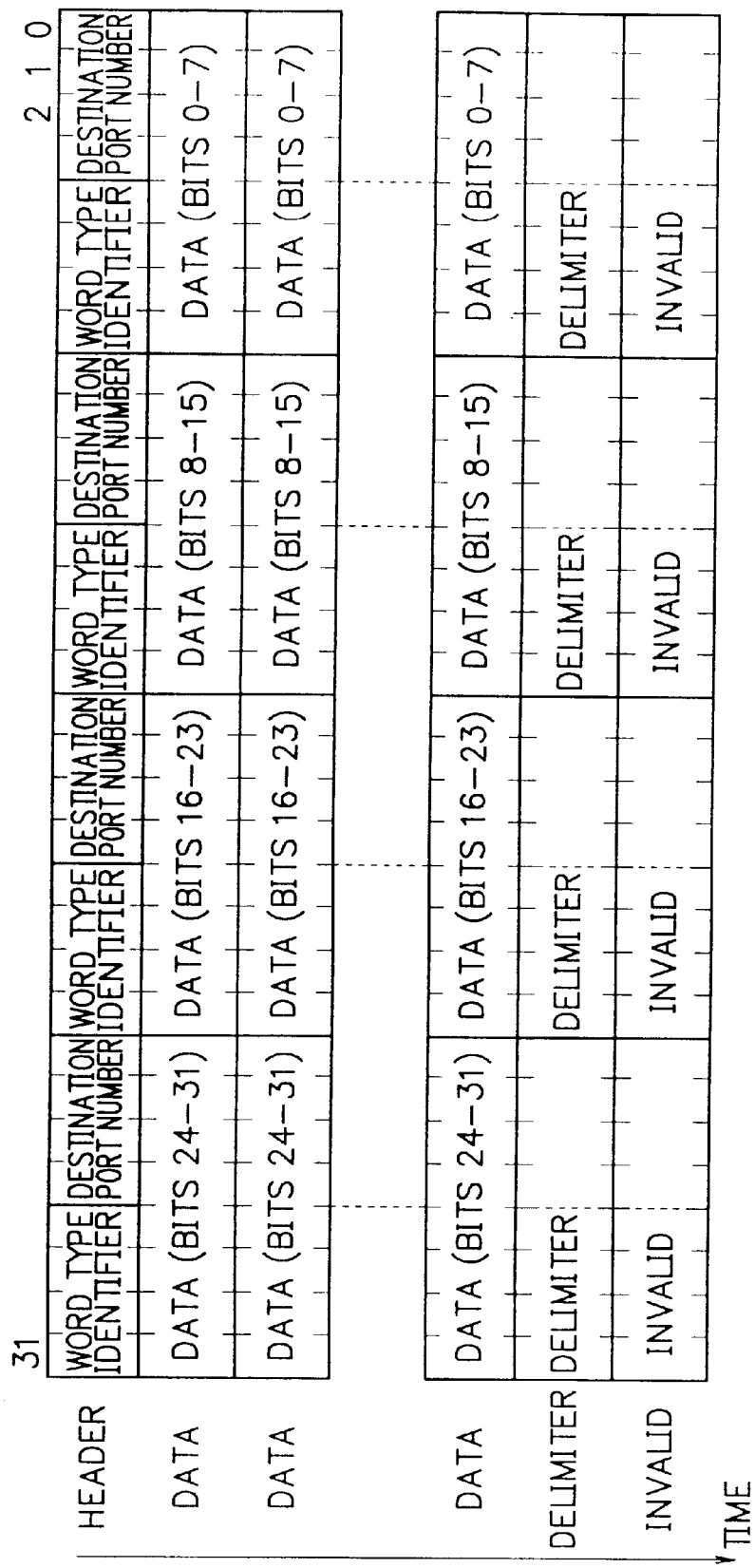
FIG. 23 is a schematic diagram showing the format of a cell in the bus switch of FIG. 22.

FIG. 23 is a schematic diagram showing the format of a cell in the bus switch of FIG. 22. Referring to FIG. 23, a 32-bit word which is driven on the bus 4 is partitioned into four 8-bit subwords. A header is also partitioned into four 8-bit subwords (subheaders). Each subheader includes a word type identifier and a destination port number.

Incidentally, in the case where the switch module 2 has to discriminate between a subword of data and a subword of a header or a delimiter, a word type identifier of 1 bit has to be added to each subword (i.e. ((8+1)-bit subword)×4).

Figure 24:
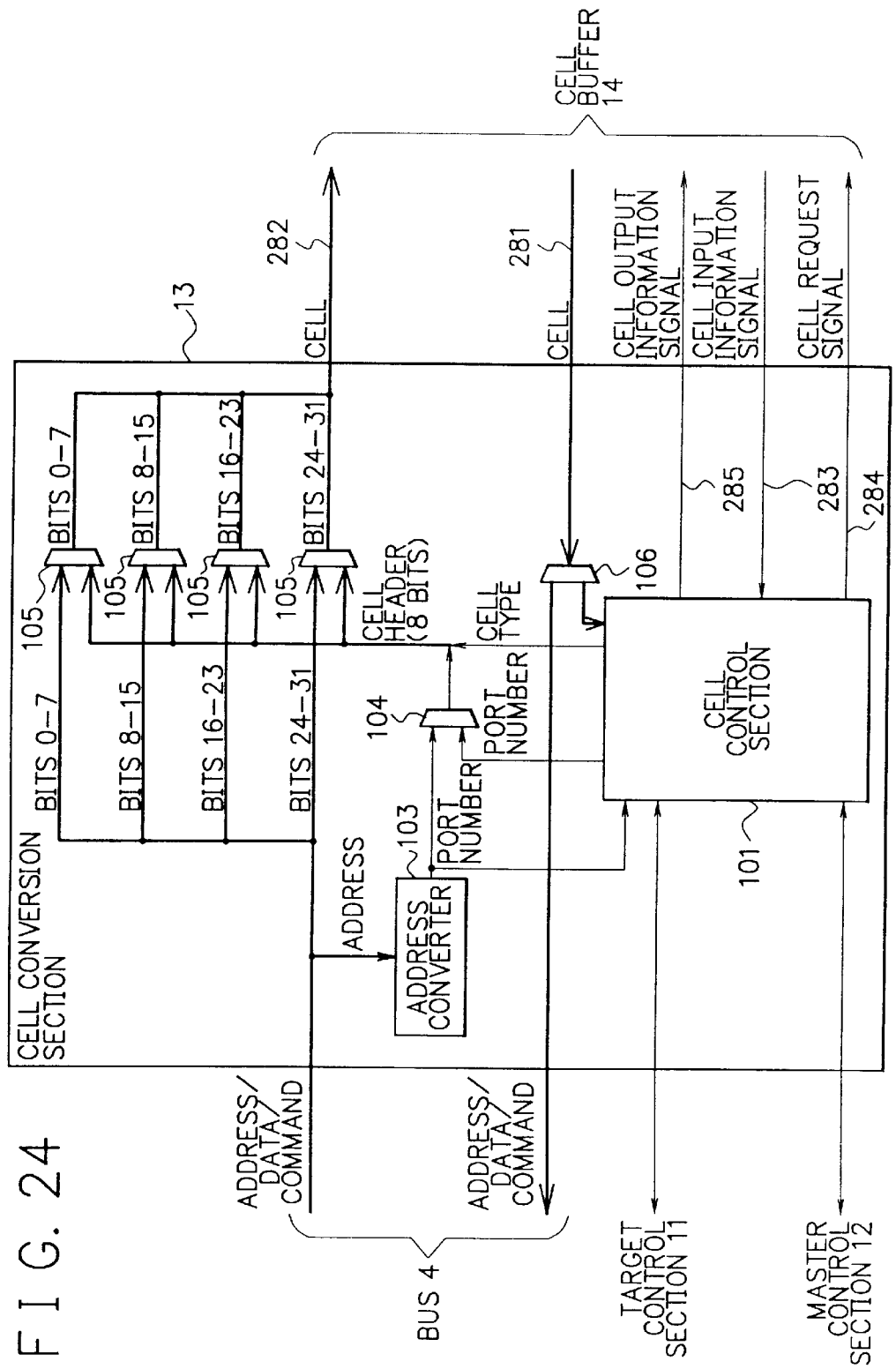
FIG. 24 is a block diagram showing an example of internal composition of a cell conversion section that is included in a bus bridge which is shown in FIG. 22.

FIG. 24 is a block diagram showing an example of internal composition of a cell conversion section 13 that is included in the bus bridge 1 which is shown in FIG. 22. Referring to FIG. 24, an addresses and/or a command and/or data which are supplied from the bus 4 is partitioned into 4 segments in units of 8 bits. To each segment, an 8-bit cell header is added by the selector 105, and the segments are sent to the cell buffer 14.

Figure 25:
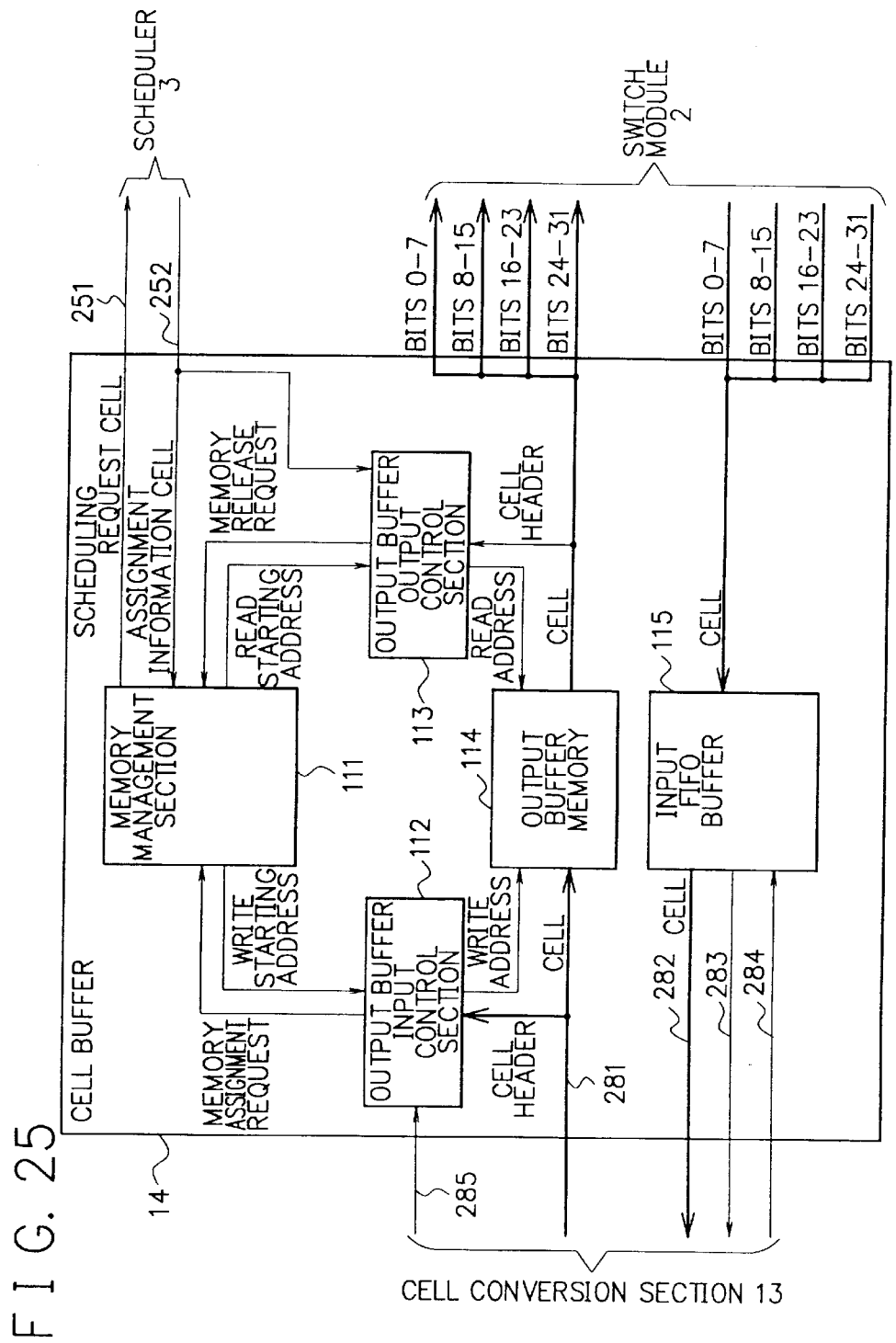
FIG. 25 is a block diagram showing an example of internal composition of a cell buffer that is included in a bus bridge which is shown in FIG. 22.

FIG. 25 is a block diagram showing an example of internal composition of the cell buffer 14 that is included in the bus bridge 1 which is shown in FIG. 22. Referring to FIG. 25, a cell which have been permitted by the scheduler 3 to be transferred is partitioned into 4 parts in units of 8 bits, and the four parts are transmitted to the four separate switch modules 2 via four separate lines respectively. On the other hand, the 8-bit subwords which are transmitted from the four switch modules 2 via the four lines are bundled together into a 32-bit word and supplied to the input FIFO buffer 115.

The bus switch according to the eighth embodiment of the present invention is realized as described above. Especially, in FIG. 22, a 32 bit line for connecting a bus bridge 1 and the switch module(s) 2 is divided into 4 separate 8-bit lines so as to connect the bus bridge 1 and the four separate switch modules 2 respectively.

As described above, in the bus switch according to the eighth embodiment of the present invention, a cell to be generated by the bus bridge 1 is partitioned into four subcells by partitioning each word of the cell into four segments. Each of the four subcells is generated so as to include a destination port number, and is sent to a corresponding one of the four switch modules 2 respectively. Each subcell is transferred by the corresponding switch module 2 to a destination bus bridge 1 according to the destination port number. The four subcells which have been transferred to the destination bus bridge 1 are combined together by the destination bus bridge 1. Of course the number of subcells is not limited to 4 and it is also possible to increase or decrease the number of subcells by varying the number of switch modules 2. According to the eighth embodiment, the number of buses 4 connected to the bus switch can easily be increased by partitioning the cell into many subcells and thereby decreasing the bit width of each line between the bus bridge 1 and a switch module 2. Many bus bridges 1 can be connected to one switch module 2 by decreasing the bit width of each line, and thus the number of buses 4 connected to the bus switch can be increased.

In addition, the same assignment of transfer paths should be executed in the four switch modules 2, therefore, the four switch modules 2 can be realized by the same modules of the same composition. Of course, alteration of algorithm is not necessary.

Further, many-stage-connection of switch modules (crossbar switches) is not necessary for increasing the number of buses 4 connected to the bus switch, therefore, buffering and flow control between the switch modules are unnecessary.

Incidentally, it is clear that the effects of the eighth embodiment can also be obtained even if the bit width of the whole line between the bus bridge 1 and the switch modules 2 is not 32 bits. As mentioned above, the number of the switch modules 2 (i.e. the number of the lines connecting the bus bridge 1 and the switch modules 2) is not limited to 4 and the bit width of each line is not limited to 8. The effects of the eighth embodiment can be obtained if only the switch modules 2 can execute switching of all the subcells transmitted via the separate lines.

Figure 26:
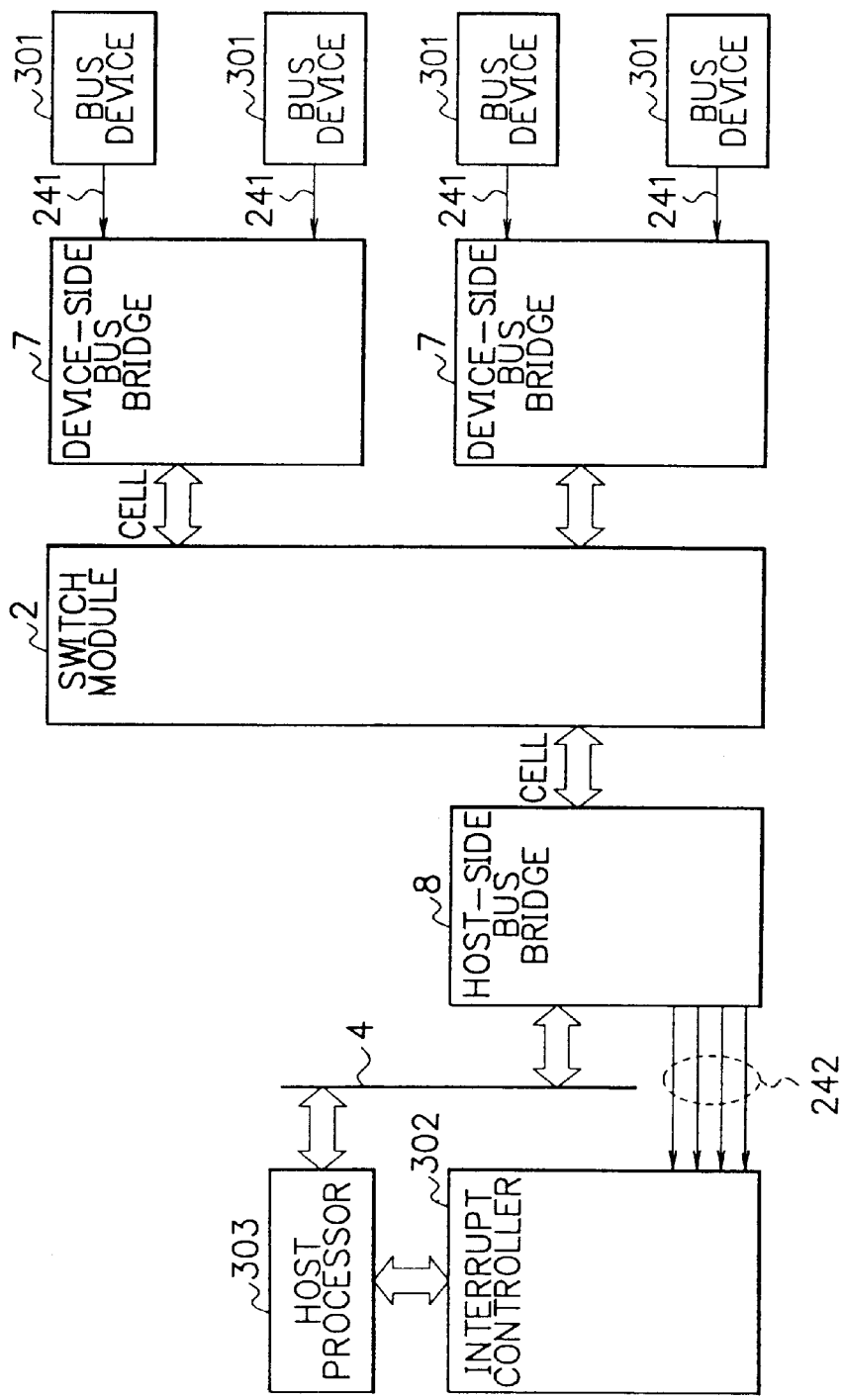
FIG. 26 is a block diagram showing a computer system that includes a bus switch according to a ninth embodiment of the present invention.

FIG. 26 is a block diagram showing a computer system that includes a bus switch according to a ninth embodiment of the present invention. Referring to FIG. 26, the bus bridge of the ninth embodiment comprises a switch module 2, two device-side bus bridges 7, a host-side bus bridge 8 and a scheduler 3. Incidentally, the scheduler 3 is not shown in FIG. 26 for brevity. Each bus device 301 is connected to one of the device-side bus bridges 7 via one or more device-side interrupt lines 241. In the case of FIG. 26, each bus device 301 is connected to one of the device-side bus bridges 7 via a device-side interrupt line 241. An interrupt controller 302 is connected to the host-side bus bridge 8 via host-side interrupt lines 242. A host processor 303, to which the interrupt controller 302 is connected, is connected to the host-side bus bridge 8 via a bus 4.

An interrupt signal which is outputted by one of the bus devices 301 is transmitted to a corresponding device-side bus bridge 7. The device-side bus bridge 7 converts the interrupt signal into an interrupt signal cell and sends the interrupt signal cell to the switch module 2. The switch module 2 transfers the interrupt signal cell to the host-side bus bridge 8. The host-side bus bridge 8 which received the interrupt signal cell activates one of the host-side interrupt lines 242 that corresponds to the bus device 301 that has outputted the interrupt signal, by interpreting the interrupt signal cell. In the case where each of the host-side interrupt lines 242 is provided corresponding to one of the bus devices 301 in a one-to-one correspondence, the host-side interrupt line 242 activated by the host-side bus bridge 8 directly indicates the bus device 301 that has outputted the interrupt signal. In the case where the number of the host-side interrupt line 242 is smaller than the number of the bus devices 301, an interrupt status register 244 in the host-side bus bridge 8 which will be described later is further used by the host processor 303 in order to identify the bus device 301 that has outputted the interrupt signal.

Figure 27:
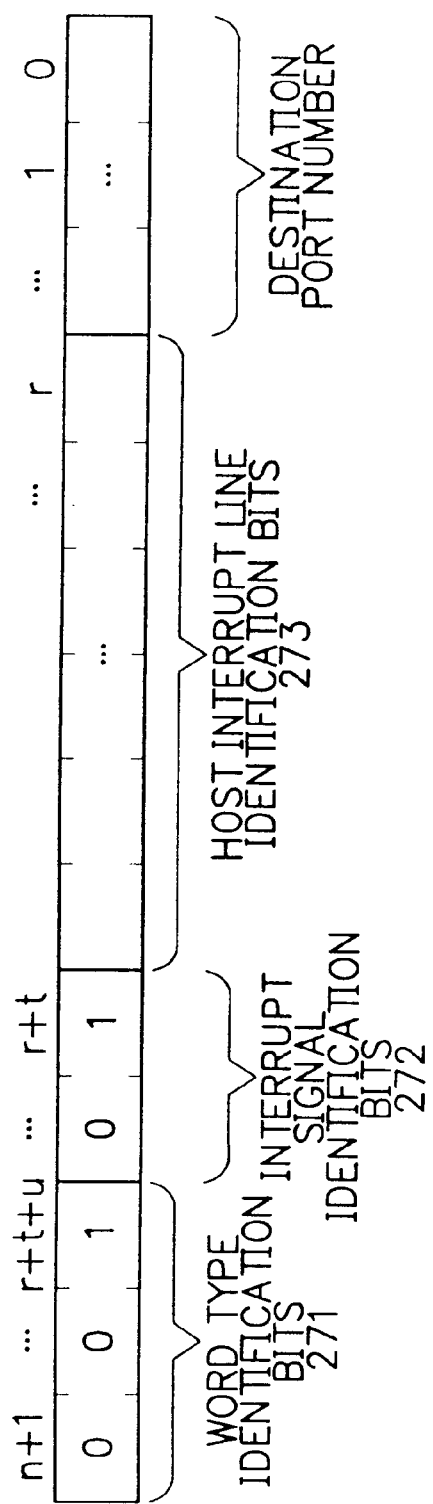
FIG. 27 is a schematic diagram showing an example of the format of an interrupt signal cell which is transferred in the bus switch shown in FIG. 26.

FIG. 27 is a schematic diagram showing an example of the format of the interrupt signal cell. Referring to FIG. 27, the interrupt signal cell is composed of one n-bit word. In the n-bit interrupt signal cell, the least significant r bits are used as destination port number bits for containing a destination port number. The next t bits following the destination port number bits are used as host interrupt line identification bits 273. The next u bits following the host interrupt line identification bits 273 are used as interrupt signal identification bits 272. And the rest (n-r-t-u bits) is used as word type identification bits 271. Incidentally, the above "destination port number" means a port number of an output port 124 of the switch module 2. In this case, the interrupt signal cell contains a port number of an output port 124 to which the host-side bus bridge 8 is connected, as the destination port number. The host interrupt line identification bits 273 are used for indicating one of the host-side interrupt lines 242 which connects the host-side bus bridge 8 and the interrupt controller 302. The host-side bus bridge 8 activates one of the host-side interrupt lines 242 that is indicated by the host interrupt line identification bits 273. The word type identification bits 271 are used for showing that the word is a bus control signal cell. Especially, the interrupt signal identification bits 272 are used for showing that the word is an interrupt signal cell.

Figure 28:
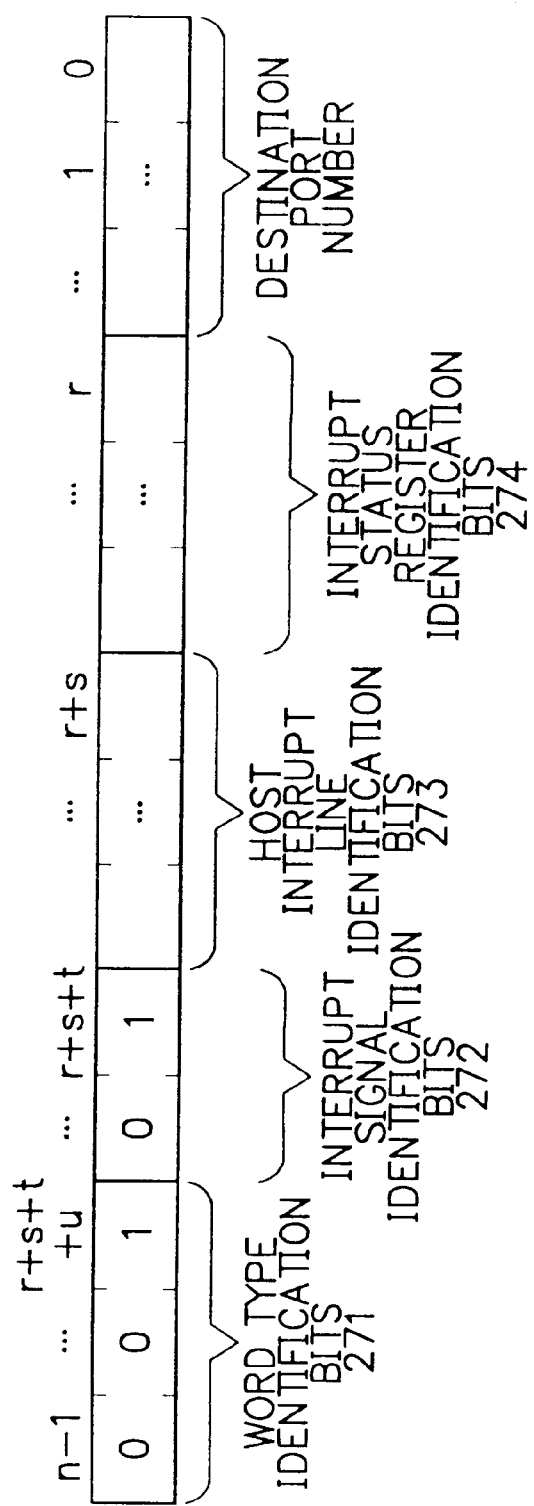
FIG. 28 is a schematic diagram showing another example of the format of the interrupt signal cell, in the case where an interrupt status register is employed in a host-side bus bridge which is shown in FIG. 26.

FIG. 28 is a schematic diagram showing another example of the format of the interrupt signal cell. Referring to FIG. 28, the interrupt signal cell is also composed of one n-bit word. The n-bit interrupt signal cell of FIG. 28 includes interrupt status register identification bits 274 differently from FIG. 27. The format of FIG. 28 is used in the case where the host-side bus bridge 8 includes the aforementioned interrupt status register 244. The interrupt status register 244 is used for identifying a bus device 301 that activated one of the host-side interrupt lines 242.

Incidentally, the formats of FIGS. 27 and 28 are only examples. Other type of a format can also be employed as long as interruption can be correctly executed by the format, that is, as long as the format can contain a destination port number for letting an interrupt signal cell be transferred in the switch module 2 to a correct output port 124 of the switch module 2, an identifier for letting the host-side bus bridge 8 activate a correct host-side interrupt line 242, and an identifier for letting the host-side bus bridge 8 judge that the word is an interrupt signal cell. In the case where the interrupt status register 244 is employed in the host-side bus bridge 8, the format should include an identifier for indicating a particular bit of the interrupt status register 244.

Figure 29:
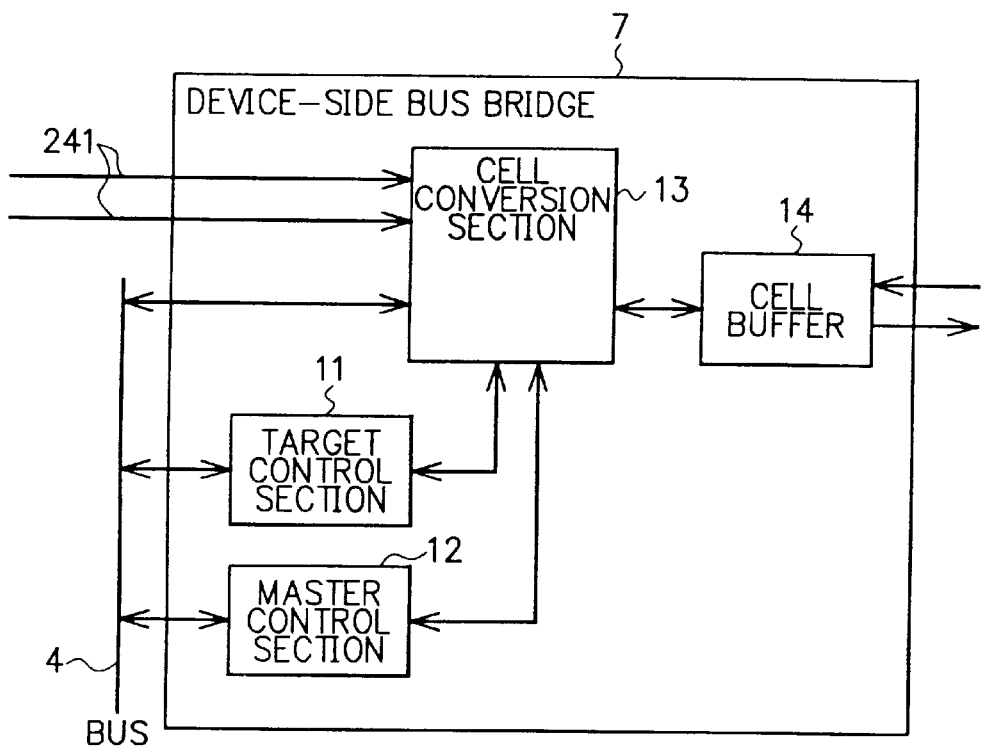
FIG. 29 is a block diagram showing an example of internal composition of a device-side bus bridge which is shown in FIG. 26.

FIG. 29 is a block diagram showing an example of internal composition of the device-side bus bridge 7. Incidentally, FIG. 29 is reversed left to right in comparison with FIG. 26. Referring to FIG. 29, the device-side bus bridge 7 is realized by adding a device-side interrupt lines 241 to the bus bridge 1 of FIG. 2. The device-side interrupt lines 241 are provided between the bus devices 301 and the cell conversion section 13 of the device-side bus bridge 7.

Figure 30:
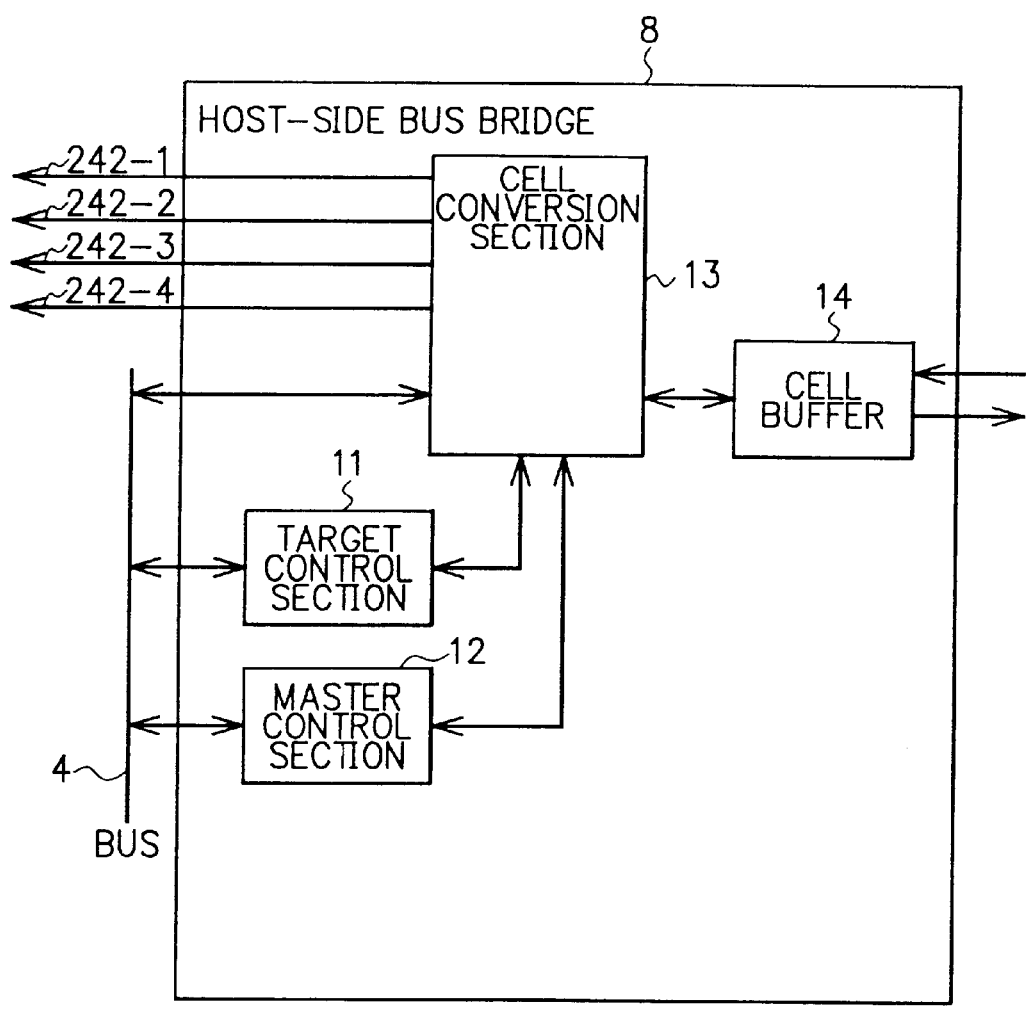
FIG. 30 is a block diagram showing an example of internal composition of the host-side bus bridge which is shown in FIG. 26.

FIG. 30 is a block diagram showing an example of internal composition of the host-side bus bridge 8. Referring to FIG. 30, the host-side bus bridge 8 is realized by adding the host-side interrupt lines 242 (host-side interrupt lines 242-1, 242-2, 242-3 and 242-4) to the bus bridge 1 of FIG. 2. The host-side interrupt lines 242-1, 242-2, 242-3 and 242-4 are provided between the interrupt controller 302 and the cell conversion section 13 of the host-side bus bridge 8.

Figure 31:
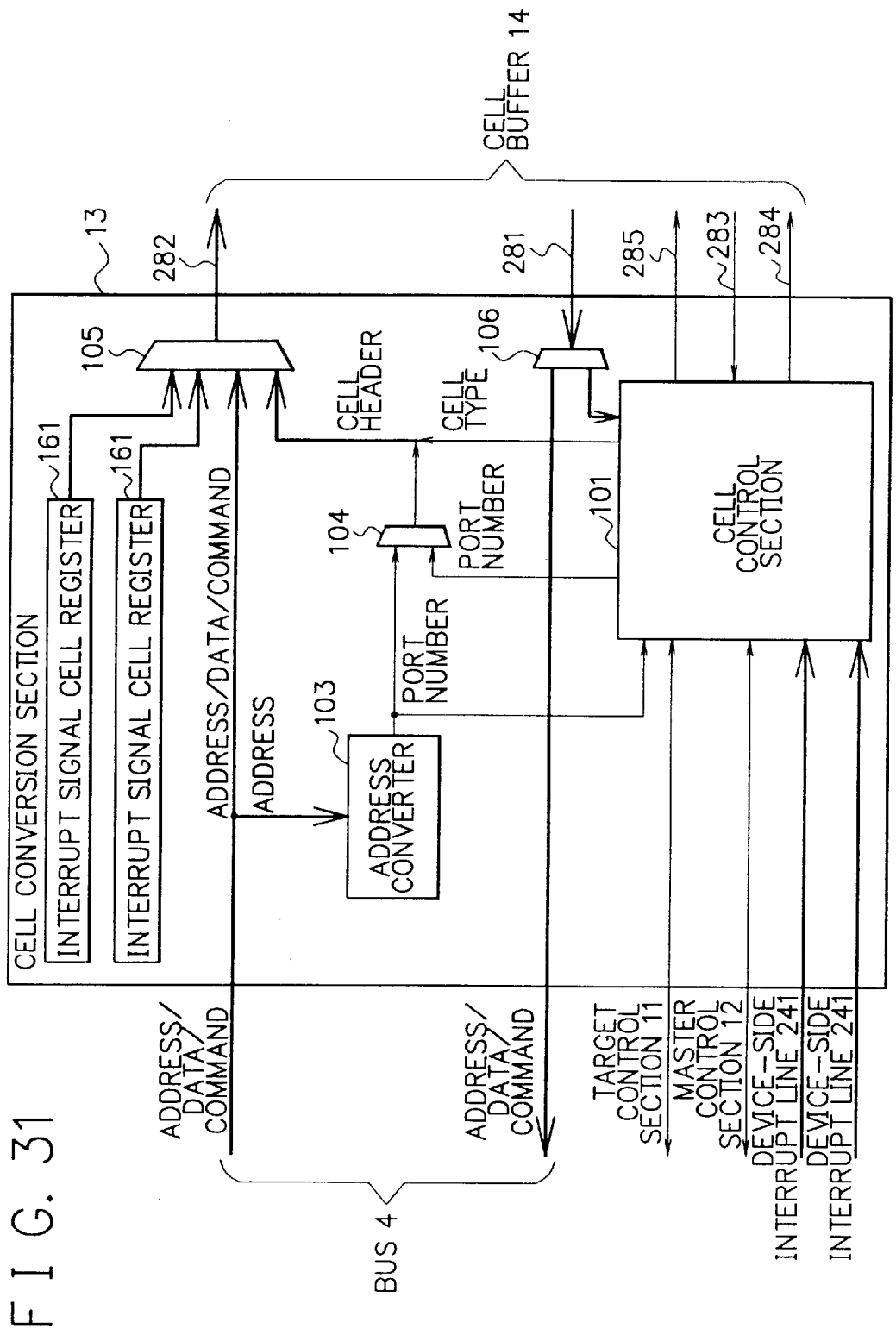
FIG. 31 is a block diagram showing an example of internal composition of a cell conversion section of the device-side bus bridge of FIG. 29.

FIG. 31 is a block diagram showing an example of internal composition of the cell conversion section 13 of the device-side bus bridge 7 of FIG. 29. The cell conversion section 13 of FIG. 31 is realized by adding interrupt signal cell registers 161 and the device-side interrupt lines 241 to the cell conversion section 13 of FIG. 3. Each interrupt signal cell register 161 stores a predetermined interrupt signal cell with respect to a bus device 301 that corresponds to the interrupt signal cell register 161. One of the bus devices 301 activates corresponding one of the device-side interrupt lines 241, and thereby lets the cell control section 101 in the cell conversion section 13 start interrupt signal processing with respect to the bus device 301. After starting the interrupt signal processing, the cell control section 101 switches the selector 105 and thereby lets an interrupt signal cell, which has been stored in a interrupt signal cell register 161 corresponding to the bus devices 301, be outputted to the cell buffer 14 which is shown in FIG. 29.

Figure 32:
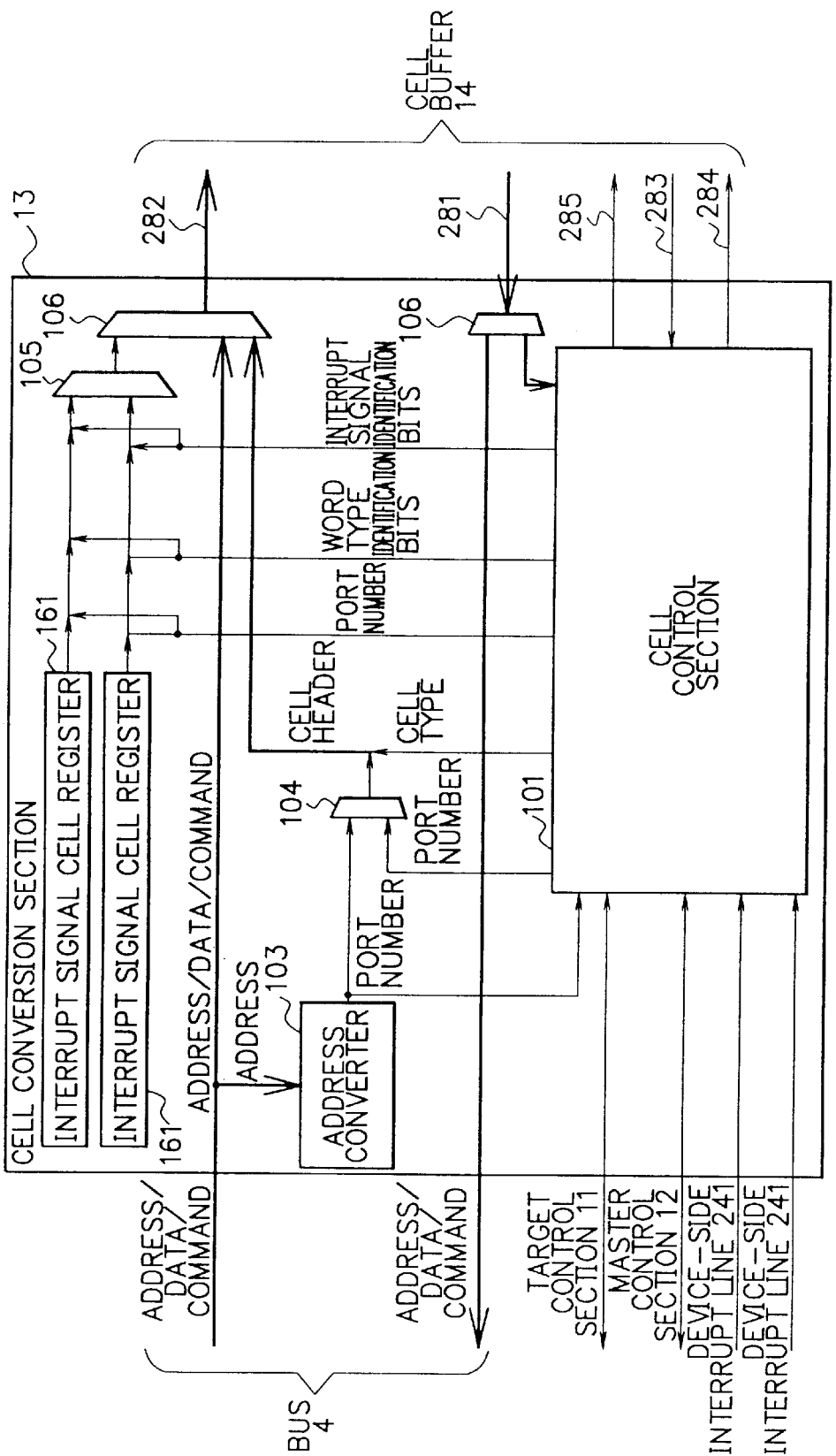
FIG. 32 is a block diagram showing another example of internal composition of the cell conversion section of the device-side bus bridge of FIG. 29
Figure 33:
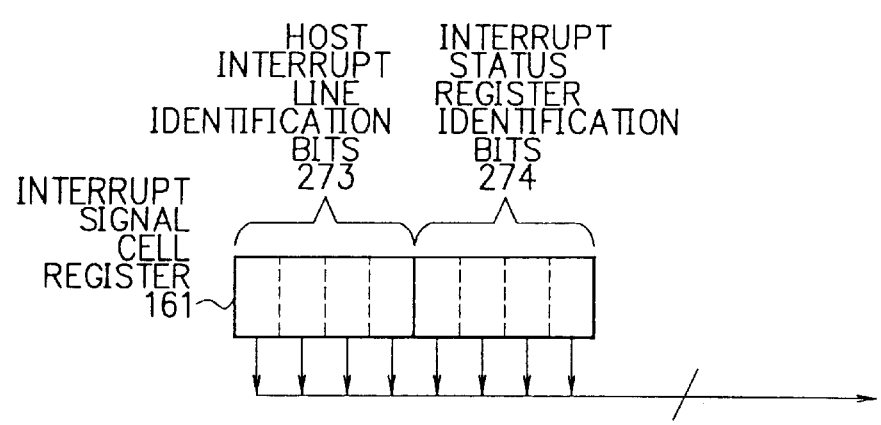
FIG. 33 is a schematic diagram showing an example of an interrupt signal cell register which is provided to the cell conversion section of FIG. 32.

FIG. 32 is a block diagram showing another example of internal composition of the cell conversion section 13 of the device-side bus bridge 7 of FIG. 29. While the interrupt signal cell register 161 in the above explanation stored the whole bits of the interrupt signal cell, it is also possible to let the interrupt signal cell register 161 store part of the interrupt signal cell that is specific to the interrupt signal cell (i.e. part that indicates one of the bus devices 301 or one of the hostside interrupt lines 242). The other part of the interrupt signal cell is realized by logic elements, and the two parts combined together is outputted by the selector 105, as shown in FIG. 32. For example, the interrupt signal cell register 161 may store the host-side interrupt line identification bits 273 indicating one of the host-side interrupt lines 242, only. In the case where the host-side bus bridge 8 is provided with the interrupt status register 244 which will be shown in FIG. 35, the interrupt signal cell register 161 may store the hostside interrupt line identification bits 273 and the interrupt status register identification bits 274 which have been shown in FIG. 28 as shown in FIG. 33. The interrupt status register identification bits 274 are used for designating a particular bit in the interrupt status register 244. In this case, the cell control section 101 outputs the destination port number bits, the word type identification bits 271 and the interrupt signal identification bits 272 as shown in FIG. 32. The output of the cell control section 101 and the output of the interrupt signal cell register 161 are combined together to form the interrupt signal cell, and the interrupt signal cell is outputted to the cell buffer 14 via the selector 105. Incidentally, it is also possible to let the interrupt signal cell register 161 further store one or two selected from the destination port number bits, the word type identification bits 271 and the interrupt signal identification bits 272.

Figure 34:
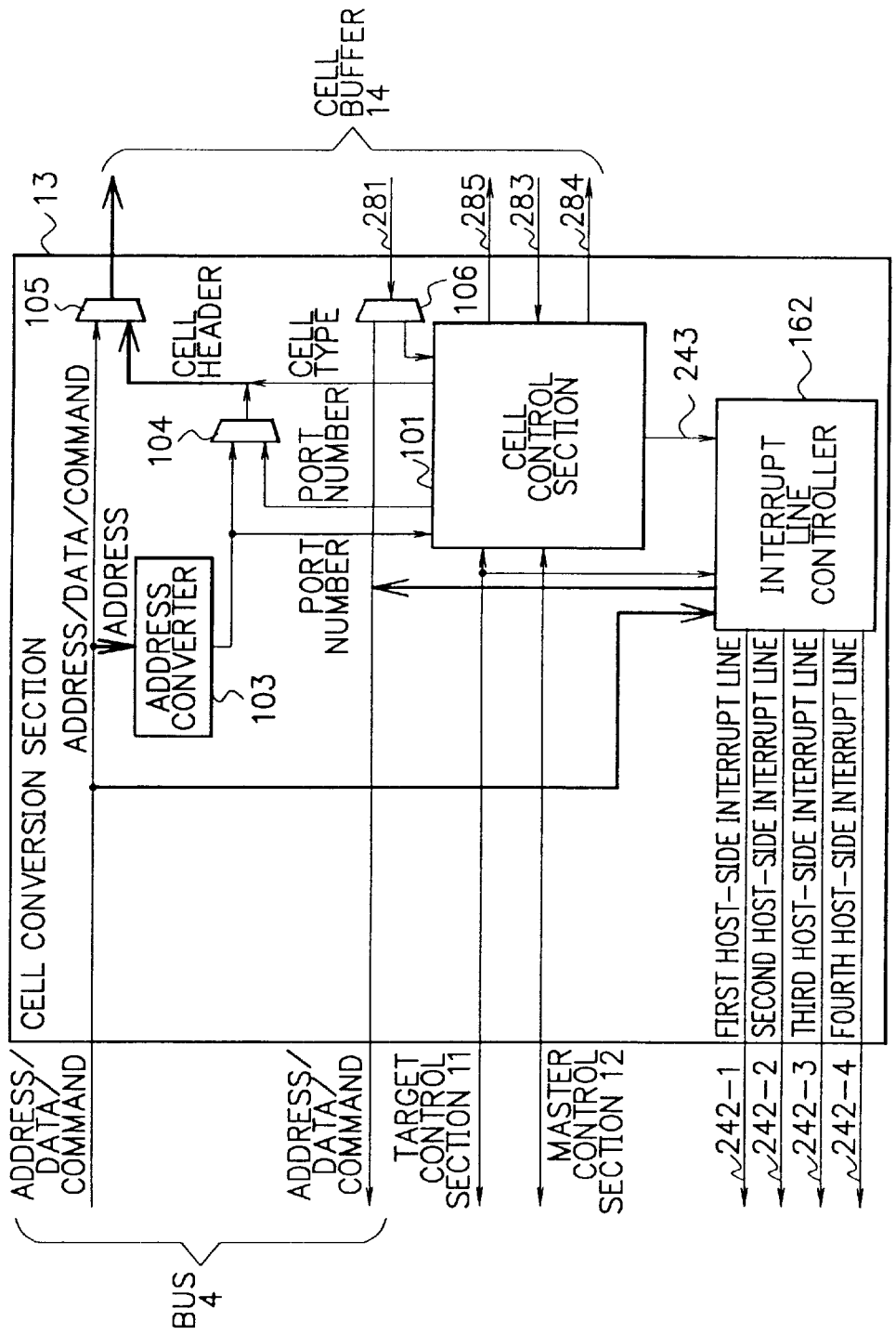
FIG. 34 is a block diagram showing an example of internal composition of a cell conversion section of the host-side bus bridge of FIG. 30.

FIG. 34 is a block diagram showing an example of internal composition of the cell conversion section 13 of the host-side bus bridge 8 of FIG. 30. The cell conversion section 13 of FIG. 34 is realized by adding an interrupt line controller 162 to the cell conversion section 13 of FIG. 3. The interrupt line controller 162 shown in FIG. 34 includes the aforementioned interrupt status register 244. An interrupt line controller input signal 243 is supplied from the cell control section 101 to the interrupt line controller 162, and a particular bit of the interrupt status register 244 that is designated by the interrupt line controller input signal 243 is set. The value of the interrupt status register 244 (values of bits of the interrupt status register 244) of the interrupt line controller 162 is readable and writable from outside via the bus 4.

The host processor 303 is informed by the interrupt controller 302 about the host-side interrupt line 242 that has been activated by the host-side bus bridge 8. As described before, in the case where each of the host-side interrupt lines 242 is provided corresponding to one of the bus devices 301 in a one-to-one correspondence, the host processor 303 can directly identify the bus device 301 that has outputted the interrupt signal by the activated host-side interrupt line 242. In the case where the number of the host-side interrupt line 242 is smaller than the number of the bus devices 301, the host processor 303 reads out the value of the interrupt status register 244 and thereby identifies a bus device 301 that has outputted the interrupt signal. When processing requested by the interrupt signal cell is finished, the host processor 303 resets the bit of the interrupt status register 244 which has been set.

The interrupt line controller input signal 243 can be realized by, for example, part of the interruption signal cell other than the destination port number bits, that is, the word type identification bits 271, the interrupt signal identification bits 272, the host interrupt line identification bits 273 and the interrupt status register identification bits 274 combined together. It is also possible to let the cell control section 101 interpret the word type identification bits 271 and the interrupt signal identification bits 272 and substitute the word type identification bits 271 and the interrupt signal identification bits 272 in the interrupt line controller input signal 243 with 1 bit signal for informing the interrupt line controller 162 whether the word is an interruption signal cell or not. Incidentally, while four host-side interrupt lines 242 (the host-side interrupt lines 242-1, 242-2, 242-3 and 242-4) are connected to the interrupt line controller 162 of the cell conversion section 13 of the host-side bus bridge 8 in FIG. 34, of course the number of the host-side interrupt lines can be other that 4.

Figure 35:
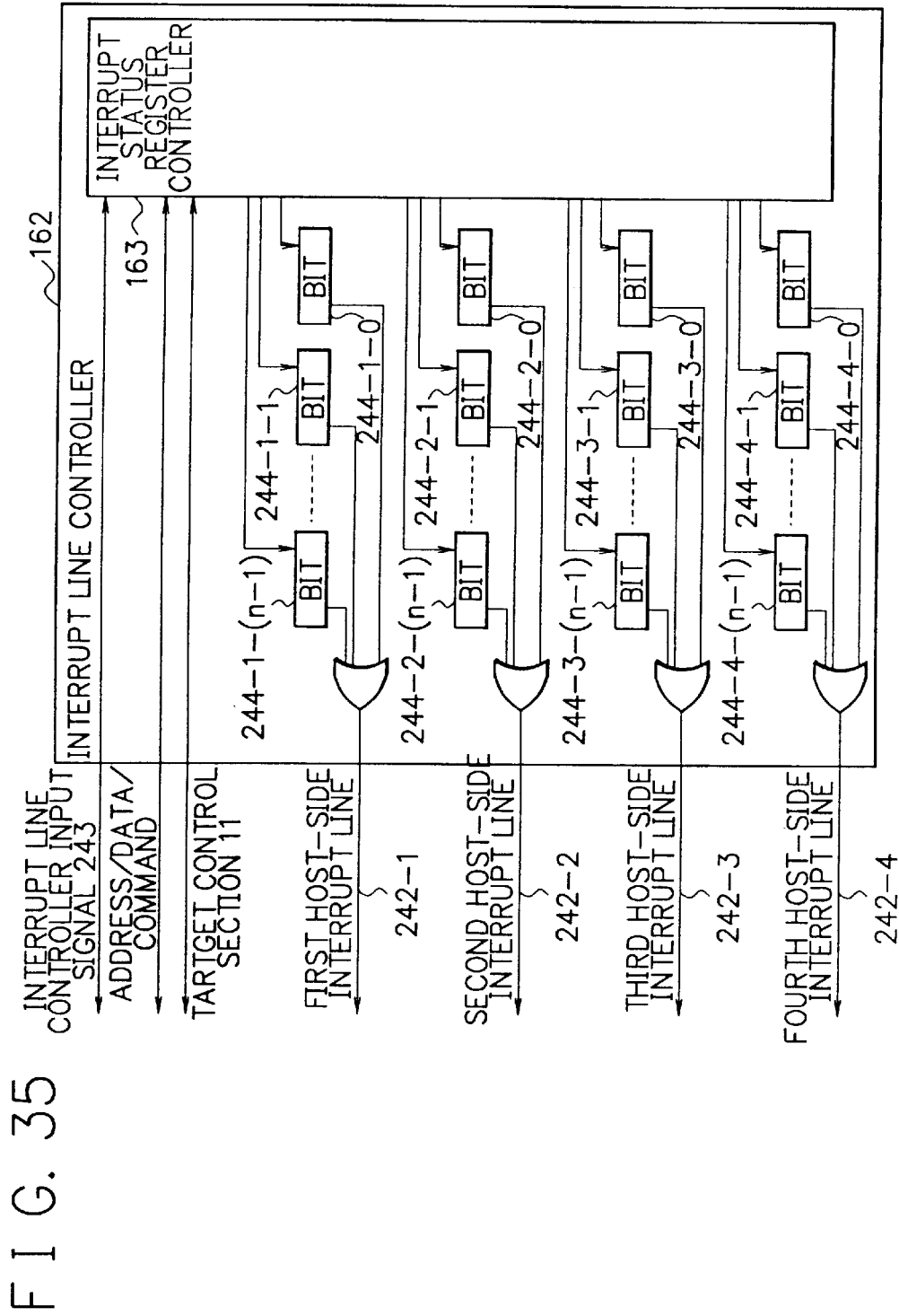
FIG. 35 is a block diagram showing an example of internal composition of an interrupt line controller of the cell conversion section of FIG. 34.

FIG. 35 is a block diagram showing an example of internal composition of the interrupt line controller 162 of the cell conversion section 13 of FIG. 34. Referring to FIG. 35, an interrupt status register controller 163 in the interrupt line controller 162 is activated by the interrupt line controller input signal 243, and a particular bit of the interrupt status register 244 that are designated by the interrupt line controller input signal 243 is set. In the case where the host-side bus bridge 8 operates as a target on the bus 4 and the master of the bus 4 executes reading to the interrupt status register 244, the interrupt status register controller 163 is controlled by the target control section 11 and outputs corresponding data in the interrupt status register 244 to the bus 4. On the other hand, in the case where the host-side bus bridge 8 operates as a target on the bus 4 and the master of the bus 4 executes writing to the interrupt status register 244, the interrupt status register controller 163 is controlled by the target control section 11 and writes data on the bus 4 to corresponding bits of the interrupt status register 244. Logical OR of values of bits of the interrupt status register 244 corresponding to one host-side interrupt line 242 is taken by an OR gate which is shown in FIG. 35, and a host-side interrupt lines 242 whose logical OR is 1 is activated. In the case where the host-side interrupt lines 242 are supposed to operate in negative-true logic, the output of the OR gates are inverted by inverter gates etc.

FIG. 36 is a table showing an example of the correspondence between the input and the output of the interrupt line controller 162 of FIG. 35, in the case where the interrupt line controller input signal 243 supplied to the interrupt line controller 162 is composed of the word type identification bits 271, the interrupt signal identification bits 272, the host interrupt line identification bits 273 and the interrupt status register identification bits 274. Referring to FIG. 36, the word type identification bits 271 are composed of 3 bits. When the word type identification bits 271 of a word are "001", the word is a bus control signal cell. The interrupt signal identification bits 272 are composed of 2 bits. When the interrupt signal identification bits 272 of a word are "01", the word is an interrupt signal cell. The host interrupt line identification bits 273 are composed of 2 bits so as to be able to designate one of the 4 host-side interrupt lines 242. The "q" in FIG. 36 is the value of the interrupt status register identification bits 274. In the case where the word type identification bits 271 are "001" and the interrupt signal identification bits 272 are "01, a bit "244-1-q" of the interrupt status register 244 is set if the host interrupt line identification bits 273 are "00", a bit "244-2-q" of the interrupt status register 244 is set if the host interrupt line identification bits 273 are "01", a bit "244-3-q" of the interrupt status register 244 is set if the host interrupt line identification bits 273 are "10", and a bit "244-4-q" of the interrupt status register 244 is set if the host interrupt line identification bits 273 are "11"

As described above, in the bus switch according to the ninth embodiment of the present invention, when a device-side bus bridge 7 received an interrupt signal from a bus device 301 via a device-side interrupt line 241, the device-side bus bridge 7 generates an interrupt signal cell corresponding to the device interrupt signal which is addressed to the host-side bus bridge 8, and sends the interrupt signal cell to the host-side bus bridge 8 via the switch module 2. The host-side bus bridge 8 which received the interrupt signal cell informs the interrupt controller 302 of the host processor 303 about occurrence of an interrupt and information concerning the bus device 301 that has outputted the interrupt signal by activating one of the host-side interrupt lines 242 between the host-side bus bridge 8 and the interrupt controller 302 that corresponds to the bus device 301 that has outputted the interrupt signal. In the case where the number of the host-side interrupt lines 242 is smaller than the number of the bus devices 301, an interrupt status register 244 is employed in the host-side bus bridge 8. The host-side bus bridge 8 which received the interrupt signal cell sets a particular bit of the interrupt status register 244 that corresponds to the bus device 301 that has outputted the interrupt signal so that the host processor 303 will be able to read the value of the interrupt status register 244 and thereby identify the bus device 301 that has outputted the interrupt signal, and informs the interrupt controller 302 of the host processor 303 about occurrence of an interrupt and information concerning the bus device 301 that has outputted the interrupt signal by activating one of the host-side interrupt lines 242 that corresponds to the particular bit of the interrupt status register 244.

Therefore, by use of the interrupt signal cells, it becomes unnecessary to provide special-purpose interrupt lines across two or more buses in order to realize transfer of interrupt signals across two or more buses. Even when the distance between two buses (the distance between two bus bridges) is long, a device-side interrupt line 241 from a bus device 301 should be connected to a nearby device-side bus bridge 7 only, therefore, transfer of the interrupt signals can be realized with the simple design of the interrupt lines.

FIG. 37 is a block diagram showing an example of internal composition of a switch module 2 which is included in a bus switch according to a tenth embodiment of the present invention. Referring to FIG. 37, each word of a cell supplied to an input port 121 is inputted to an arbiter 140. When a word that is a header is supplied to the arbiter 140, the arbiter 140 judges whether or not cell collision at the output port 124 will occur. In the case where the arbiter 140 judged that cell collision will not occur, the arbiter 140 outputs the header to the output port multiplexer 123 corresponding to the input port 121 as an arbiter output signal 232 (as the output port multiplexer control signal 201). In the case where the arbiter 40 judged that cell collision will occur, an error signal 233 corresponding to the input port 121 is activated. In this case, the arbiter output signal 232 (the output port multiplexer control signal 201) is not activated, and thus the output port multiplexer 123 corresponding to the input port 121 is not activated and the inputted cell is not transferred to any output ports 124.

Figure 38:
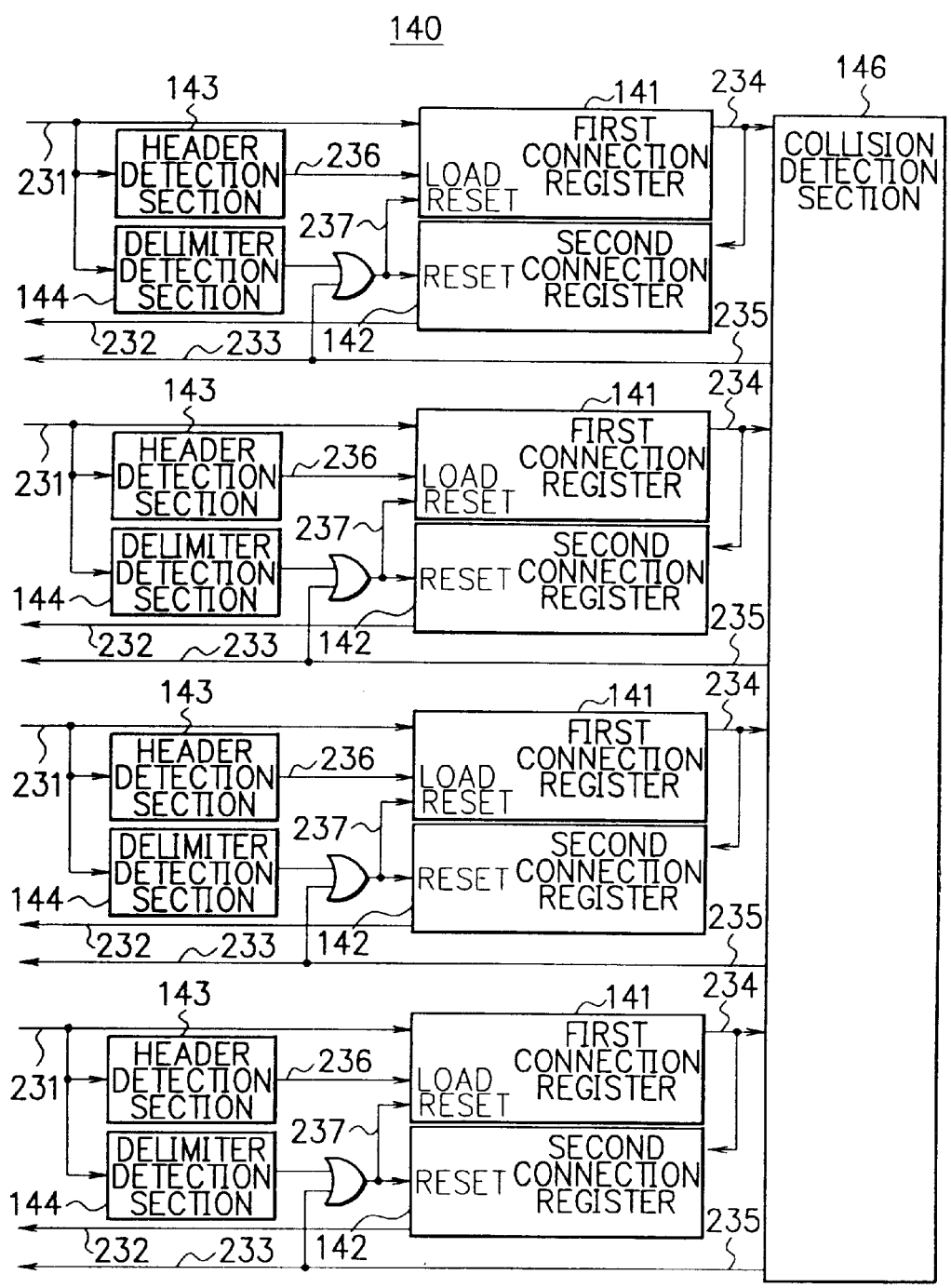
FIG. 38 is a block diagram showing an example of internal composition of an arbiter which is shown in FIG. 37.

FIG. 38 is a block diagram showing an example of internal composition of the arbiter 140 shown in FIG. 37. Referring to FIG. 38, the arbiter 140 includes connection registers corresponding to each of the input ports 121 of the switch module 2. The connection register is composed of a first connection register 141 and a second connection register 142. Each word which is supplied to the arbiter 140 is inputted to an header detection section 143 and a delimiter detection section 144. In the case where the word supplied to the arbiter 140 is a header, the header detection section 143 activates a header detection signal 236 and thereby lets the first connection register 141 latch the header.

In the case where the word supplied to the arbiter 140 is a delimiter, the delimiter detection section 144 activates its output signal and thereby a reset signal 237 is activated, thereby both the first connection register 141 and the second connection register 142 are activated. The header latched by the first connection register 141 is supplied to a collision detection section 146 as a collision detection input signal 234. The collision detection section 146 executes collision detection and outputs the result of the collision detection as a collision detection output signal 235.

When cell collision at an output port 124 is detected, the collision detection section 146 activates the collision detection output signal 235, and thereby an error signal 233 and the reset signal 237 corresponding to the input port 121 to which the word has been supplied are activated. Therefore, the first connection register 141 and the second connection register 142 are reset, and thus the header is not outputted by the second connection register 142 as the arbiter output signal 232 (as the output port multiplexer control signal 201). Thus, the output port multiplexer 123 shown in FIG. 37 (corresponding to the input port 121 to which the word has been supplied) does not output the word 202 to any output ports 124.

On the other hand, when cell collision at an output port 124 is not detected, the collision detection section 146 does not activate the collision detection output signal 235. Therefore, the word latched by the first connection register 141 is supplied to the second connection register 142 and latched by the second connection register 142. The word latched by the second connection register 142 is outputted as the arbiter output signal 232 (as the output port multiplexer control signal 201) in the next clock cycle.

Figure 39:
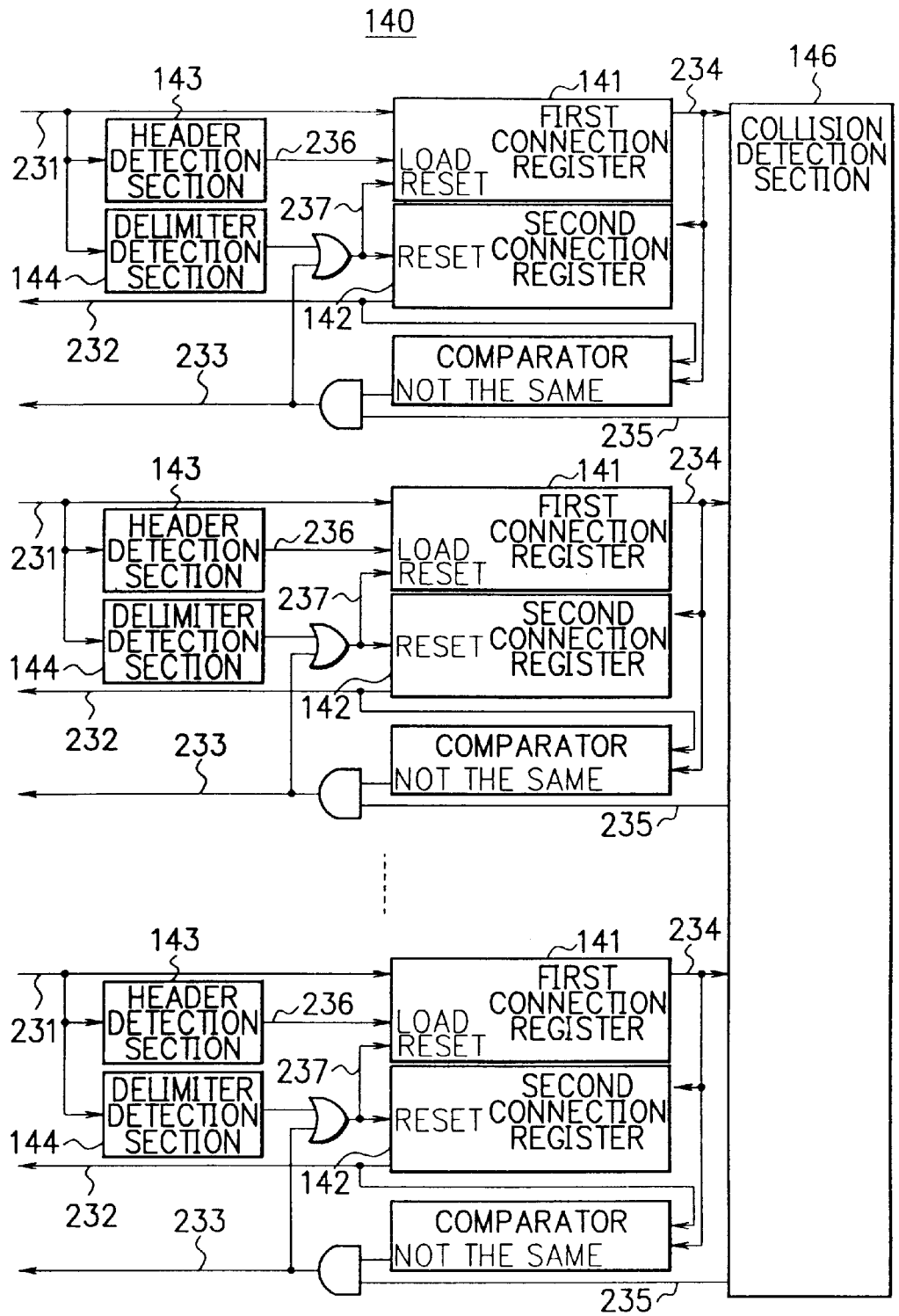
FIG. 39 is a block diagram showing another example of internal composition of the arbiter which is shown in FIG. 37.

FIG. 39 is a block diagram showing another example of internal composition of the arbiter 140 shown in FIG. 37. The arbiter 140 of FIG. 39 is realized by adding comparators and AND gates to the arbiter 140 of FIG. 38. The comparator activates its output signal when the outputs of the first connection register 141 and the second connection register 142 are not the same. Therefore, the error signal 233 (i.e. the output of the AND gate) is activated and the first connection register 141 and the second connection register 142 are reset only when the outputs of the first connection register 141 and the second connection register 142 are not the same and the collision detection output signal 235 is activated by the collision detection section 146. By such composition, when the same two headers are successively latched by the first connection register 141, process due to collision detection (generation of the error signal) is not executed and assignment of a transfer path in the switch module 2 can be executed automatically. With such composition of the arbiter 140, it is also possible to realize a bus switch in which scheduling request to the scheduler 3 is unnecessary when cells are transferred in an assigned transfer path successively.

Figure 40:
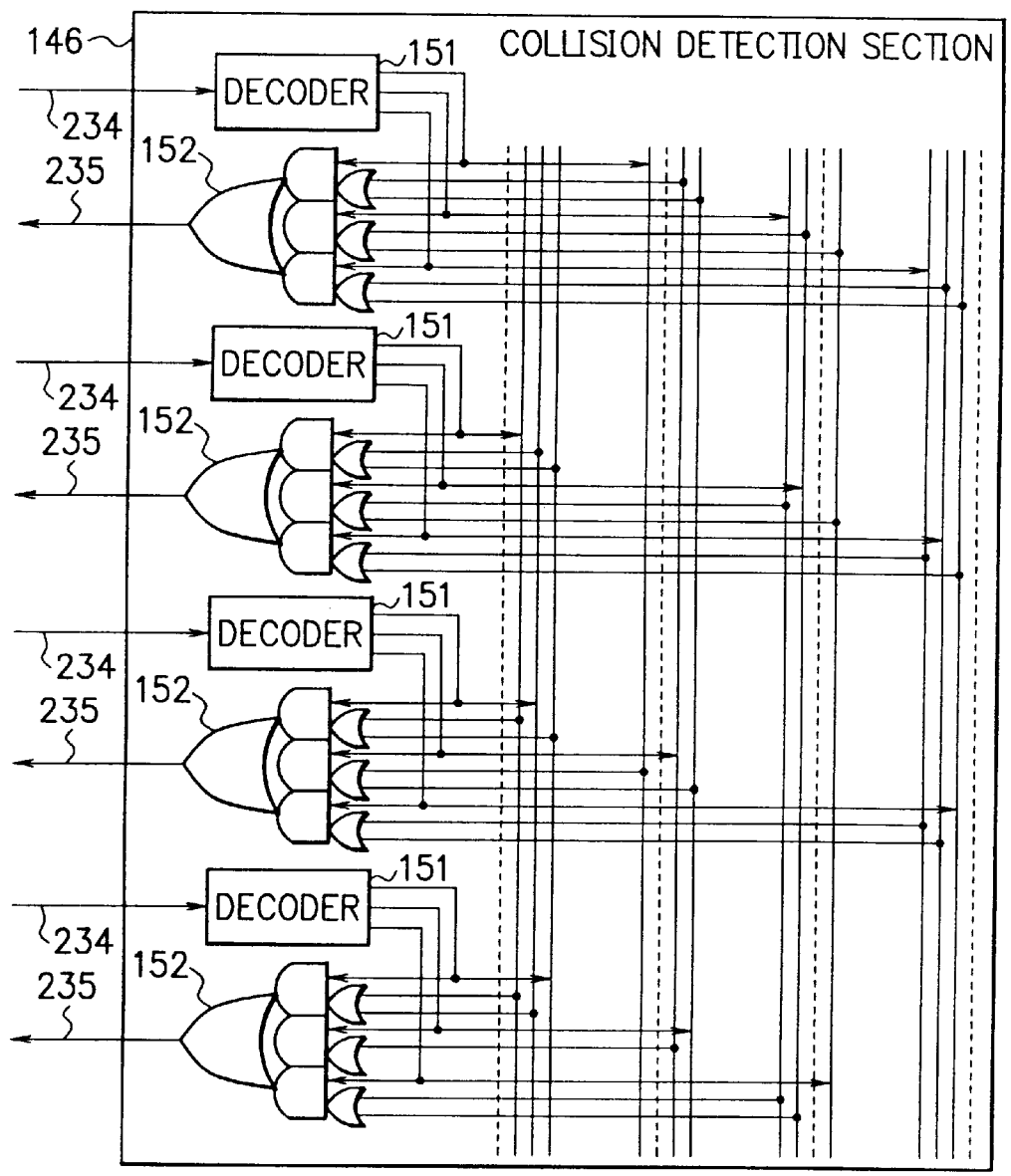
FIG. 40 is a block diagram showing an example of internal composition of a collision detection section of the arbiter of FIGS. 38 and 39.

FIG. 40 is a block diagram showing an example of internal composition of the collision detection section 146 of the arbiter 140 of FIG. 38 and 39. Referring to FIG. 40, the collision detection input signal 234 is supplied to a decoder 151 and one of output port lines requested by the collision detection input signal 234 is activated by the decoder 151. The collision detection output signal 235 is activated when another output port line corresponding to the same output port has already been activated. The collision detection output signal 235 is not activated when no other output port line corresponding to the same output port has been activated yet. Cell collision at an output port 124 requested by the collision detection input signal 234 can be detected by the composition described above.

As described above, in the bus switch according to the tenth embodiment of the present invention, the switch module 2 includes a collision detection section 146 for judging whether or not cell collision at output ports 124 of the switch module 2 will occur. When a cell is inputted to the switch module 2, a line of the collision detection section 146 corresponding to the destination output port of the cell is set, and the line is reset when the cell passed the switch module 2. When the line of the collision detection section 146 corresponding to the destination output port of the inputted cell has already been set, it is judged that the cell has not been given a transfer permission by the scheduler 3 but has been supplied to the switch module 2 by accident, or the destination port number of the cell has changed by data error etc. In such cases, the cell is abandoned and an error procedure is started.

Therefore, even when a cell which has not been given a transfer permission by the scheduler 3 is supplied to the switch module 2 by accident or the destination port number of the cell has changed by data error etc., connection of the transfer path in the switch module 2 for the cell is not executed if cell collision at the destination output port 124 will occur. Therefore, cell collision at output ports 124 of the switch module 2 by accident is avoided, and thereby malfunction and destruction in the switch module 2 can be prevented. When cell collision at an output port 124 will occur, an error signal 233 corresponding to the input port 121 is activated, therefore, a cell abandoned by the switch module 2 can be identified based on the error signal 233.

Figure 41:
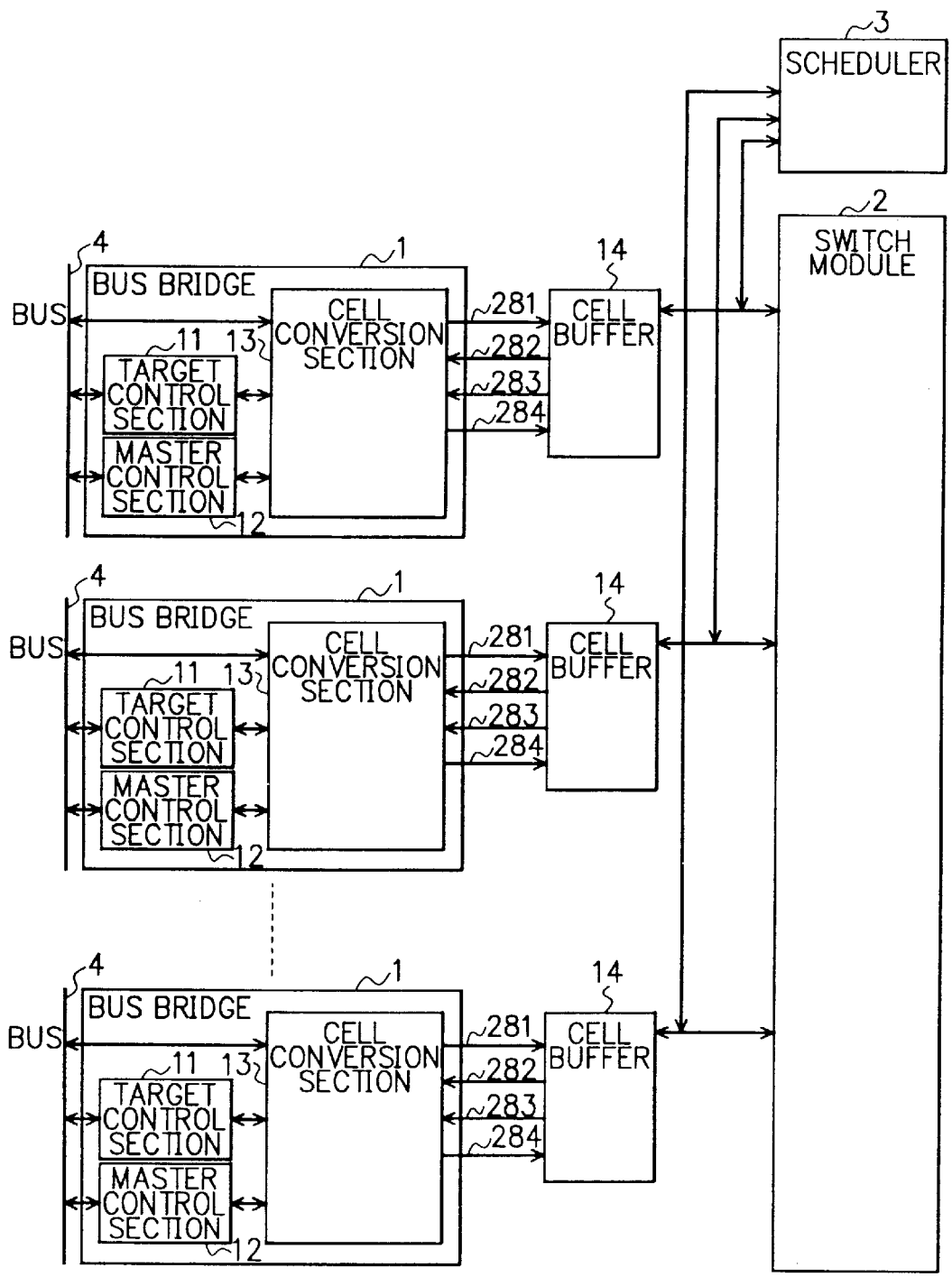
FIG. 41 is a block diagram showing a bus switch according to an eleventh embodiment of the present invention.

FIG. 41 is a block diagram showing a bus switch according to an eleventh embodiment of the present invention. Referring to FIG. 41, the cell buffer 14 is placed outside the bus bridge 1. The bus bridge 1 and the cell buffer 14 execute communication via lines. Concretely, the lines between the cell conversion section 13 and the cell buffer 14 are composed of a cell buffer input line 281 for transmitting cells from the cell conversion section 13 to the cell buffer 14, a cell buffer output line 282 for transmitting cells from the cell buffer 14 to the cell conversion section 13, a cell arrival information line 283 for letting the cell buffer 14 inform the cell conversion section 13 about cell arrival, and a cell request line 284 for letting the cell conversion section 13 request the cell buffer 14 cell transmission. By the composition described above, the physical distance between the switch module 2 and the cell buffers 14 can be shortened.

As described above, in the bus switch according to the eleventh embodiment of the present invention, the cell buffer 14, in which cells generated by the bus bridge 1 are temporarily stored waiting for the transfer permission by the scheduler 3, is provided separately from the bus bridge 1, and the bus bridge 1 and the cell buffer 14 are connected via lines. By such composition, the cell buffer 14, in which cells wait for the transfer permission by the scheduler 3, can be placed near the scheduler 3 and the switch module 2. Therefore, transfer time of the scheduling cells (scheduling request cells and assignment information cells) can be shortened and thereby processing time for scheduling can be shortened, and communication time between the cell buffers 14 and the switch module 2 can be minimized. Consequently, the availability of the switch module 2 and the throughput of the bus switch can be improved. Further, the bus bridge 1 and the cell buffer 14 can be formed on separate two LSIs, therefore, circuit scale (the number of gates) of the bus bridge 1 can be decreased.

As set forth hereinabove, in the first embodiment, a destination port number is added to a cell when the cell is generated and outputted by a bus bridge 1. The switch module 2 transfers the cell to one of the output ports 124 according to the destination port number in the cell, and thereby the cell is transferred to a destination bus bridge 1. According to the first embodiment, the scheduler 3 does not have to directly control connection of transfer paths in the switch module 2. Therefore, the scheduler 3 and the switch module 2 do not have to be connected together via lines, and thus the scheduler 3 and the switch module 2 can be formed in separate and independent two LSIs. Consequently, the number of buses 4 connected to the bus switch can be increased easier in comparison with conventional bus switches.

In the second embodiment, the bus bridge 1 transmits the transmission completion information cell to the scheduler 3 at the completion of cell transmission and thereby informs the scheduler 3 about completion of cell transfer via the switch module 2. By this, the switch module 2 does not have to execute request for the next scheduling to the scheduler 3, and thus the scheduler 3 and the switch module 2 do not have to be connected together via lines. By appropriately setting timing for transmitting the transmission completion information cell from the bus bridge 1, the scheduler 3 can start assignment of the next transfer path in the switch module 2 with minimum delay after the bus bridge 1 completed cell transmission, therefore, the availability of the switch module 2 can be raised and the throughput of the bus switch can be increased.

In the third embodiment, the bus bridge 1 adds word type identification bits for indicating the type of a word to each word of a cell. The word type identification bits are used by the switch module 2 for judging whether a word is part of a transaction cell or a bus control signal cell. By use of the word type identification bits, bus control signal cells can be inserted in a transaction cell. The bus bridge 1 can transmit a bus control signal cell before completion of transmission of a transaction cell, and thus transfer of a bus control signal (i.e. an interrupt signal, an error signal, etc) in the bus switch can be executed faster. Therefore, operations concerning interrupt, abnormal end (ABEND), etc. can be executed faster. Such effects can be obtained without providing two separate lines (a line for transferring the transaction cells and a line for transferring the bus control signal cells) between the bus bridge 1 and the switch module 2.

In the fourth embodiment, the bus bridge 1 inserts a scheduling request cell in a transaction cell by use of the word type identification bits. The bus bridge 1 can transmit a scheduling request cell before completion of transmission of a transaction cell, and thus the scheduling cell can be transferred faster between the bus bridge 1 and the scheduler 3. Consequently, the availability of the switch module 2 can be raised and the throughput of the bus switch can be increased.

In the fifth embodiment, a bus control signal cell switch module 6 is provided specifically for transferring bus control signal cells. The bus bridge 1 and the bus control signal cell switch module 6 are connected by a special-purpose line specifically for transferring the bus control signal cells. The transaction cells and the bus control signal cells are transferred via different lines, and thus, traffic on the line between the bus bridge 1 and the switch module 2 is not affected by the transfer of the bus control signal cells between the bus bridge 1 and the bus control signal cell switch module 6. Consequently, deterioration of transfer throughput and latency of transaction cells in the bus switch due to transfer of bus control signal cells can be avoided. Further, delay in transfer of bus control signals cells due to transfer of transaction cells can also be avoided, therefore, transfer of the bus control signal cells can be speeded up.

In the sixth embodiment, a scheduling cell line specifically used for transferring the scheduling cells is provided between the bus bridge 1 and the scheduler 3. The transaction cells and the scheduling cells are transferred via different lines, and thus transfer of the scheduling cells does not affect the traffic on the line between the bus bridge 1 and the switch module 2. Therefore, deterioration of transfer throughput of the transaction cells in the switch module 2 due to transfer of the scheduling cells can be avoided, and increase of latency of the transaction cells in the bus switch can be prevented. Further, transfer of the scheduling cells can be executed faster without delayed by the transaction cells.

In the seventh embodiment, the bus bridge 1 adds cell ending information bits to a word of a transaction cell, and thereby lets the scheduler 3 know that transfer of the transaction cell will be over after a predetermined number of words. By adequately setting the predetermined number, delay time between completion of transaction cell transfer in the switch module 2 and the next scheduling by the scheduler 3 can be considerably shortened, and thus the availability of the switch module 2 can be raised and the throughput of the bus switch can be increased.

In the eighth embodiment, the bus switch includes M (M: integer larger than 1) switch modules 2, and a cell to be generated by the bus bridge 1 is partitioned into M subcells by partitioning each word of the cell into M segments. Each of the M subcells is generated so as to include a destination port number, and is sent to a corresponding switch module 2 respectively. Each subcell is transferred by the corresponding switch module 2 to a destination bus bridge according to the destination port number. The M subcells which have been transferred to the destination bus bridge 1 are combined together by the destination bus bridge 1. By the eighth embodiment, the number of buses 4 connected to the bus switch can easily be increased by increasing the number M and thereby decreasing the bit width of each line between the bus bridge 1 and one switch module 2. The M switch modules 2 can be realized by the same modules of the same composition, and alteration of algorithm is unnecessary. Further, many-stage-connection of switch modules (crossbar switches) is not necessary for increasing the number of buses 4 connected to the bus switch, and thus, buffering and flow control between the switch modules are unnecessary.

In the ninth embodiment, when a device-side bus bridge 7 received an interrupt signal from a bus device 301, the device-side bus bridge 7 generates an interrupt signal cell corresponding to the device interrupt signal which is addressed to the host-side bus bridge 8, and sends the interrupt signal cell to the host-side bus bridge 8 via the switch module 2. The host-side bus bridge 8 which received the interrupt signal cell informs the interrupt controller 302 of the host processor 303 about occurrence of an interrupt and information concerning the bus device 301 that has outputted the interrupt signal by activating one of the host-side interrupt lines 242 between the host-side bus bridge 8 and the interrupt controller 302 that corresponds to the bus device 301 that has outputted the interrupt signal. An interrupt status register 244 is employed in the host-side bus bridge 8 when the number of the host-side interrupt lines 242 is smaller than the number of the bus devices 301. The host-side bus bridge 8 which received the interrupt signal cell sets a particular bit of the interrupt status register 244 that corresponds to the bus device 301 that has outputted the interrupt signal so that the host processor 303 will be able to read the value of the interrupt status register 244 and thereby identify the bus device 301 that has outputted the interrupt signal, and informs the interrupt controller 302 of the host processor 303 about occurrence of an interrupt and information concerning the bus device 301 that has outputted the interrupt signal by activating one of the host-side interrupt lines 242 that corresponds to the particular bit of the interrupt status register 244. By use of the interrupt signal cells, it becomes unnecessary to provide special-purpose interrupt lines across two or more buses in order to realize transfer of interrupt signals across two or more buses. Transfer of the interrupt signals can be realized with simple design of interrupt lines even when the distance between two buses (the distance between two bus bridges) is long.

In the tenth embodiment, the switch module 2 includes a collision detection section 146 for judging whether or not cell collision at output ports 124 of the switch module 2 will occur. A line of the collision detection section 146 corresponding to the destination output port of a cell is set when the cell is inputted to the switch module 2, and the line is reset when the cell passed the switch module 2. When the line of the collision detection section 146 corresponding to the destination output port of the inputted cell has already been set, it is judged that the cell has not been given a transfer permission by the scheduler 3 but has been supplied to the switch module 2 by accident, or the destination port number of the cell has changed by data error etc. In such cases, the cell is abandoned and an error procedure is started. By the tenth embodiment, even when a cell which has not been given a transfer permission by the scheduler 3 is supplied to the switch module 2 by accident or the destination port number of the cell has changed by data error etc., connection of the transfer path in the switch module 2 for the cell is not executed if cell collision at the destination output port 124 will occur. Therefore, cell collision at output ports 124 of the switch module 2 by accident is avoided, and thereby malfunction and destruction in the switch module 2 can be prevented.

In the eleventh embodiment, the cell buffer 14, in which cells generated by the bus bridge 1 are temporarily stored waiting for the transfer permission by the scheduler 3, is provided separately from the bus bridge 1 and connected to the bus bridge 1 via lines. By such composition, the cell buffer 14 can be placed near the scheduler 3 and the switch module 2. Transfer time of the scheduling cells (scheduling request cells and assignment information cells) can be shortened and thereby processing time for scheduling can be shortened, and communication time between the cell buffers 14 and the switch module 2 can be minimized. Therefore, the availability of the switch module 2 and the throughput of the bus switch can be improved. Further, the bus bridge 1 and the cell buffer 14 can be formed on separate two LSIs, therefore, circuit scale (the number of gates) of the bus bridge 1 can be decreased.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A bus switch for realizing bus transaction across two or more buses, comprising:

N (N: integer larger than 1) bus bridges each of which is connected with a bus for converting an address and/or a command and/or data or an interrupt signal or an error signal which occurred on the bus into one or more cells and transmitting the cells to a switch module, and for converting a cell supplied from the switch module into an address and/or a command and/or data or an interrupt signal or an error signal and transmitting the address and/or the command and/or data or the interrupt signal or the error signal to the bus;

the switch module provided with N input ports corresponding to each of the bus bridges for receiving cells from the bus bridges and N output ports corresponding to each of the bus bridges for transmitting cells to the bus bridges, for transferring the cell from one of the input ports to one of the output ports and transmitting the cell from the output port to a bus bridge corresponding to the output port; and a scheduler for receiving a scheduling request concerning a cell from a bus bridge, checking whether or not cell collision at the output ports of the switch module will occur, and giving transmission permission of the cell to the bus bridge if the cell collision will not occur, wherein:

the bus bridge adds a destination port number indicating one of the output ports of the switch module to a cell when generating the cell, and the switch module transfers the cell to one of the output ports that is designated by the destination port number in the cell.

2. A bus switch as claimed in claim 1, wherein the bus bridge adds the destination port number to the first word of the cell.

3. A bus switch as claimed in claim 1, wherein the bus bridge informs the scheduler about completion of transmission of each cell.

4. A bus switch as claimed in claim 1, wherein the cell generated by the bus bridge is composed of a plurality of words each of which including word type identification bits for indicating the type of the word.

5. A bus switch as claimed in claim 4, wherein the word type identification bits are used by the switch module for discriminating between a header of a transaction cell, data of a transaction cell, a delimiter of a transaction cell and an invalid word.

6. A bus switch as claimed in claim 4, wherein the switch module includes two or more independent cell switch means corresponding to a cell type, and each word of cells is distributed to one of the cell switch means based on the word type identification bits of the word, and each of the cell switch means transfers the distributed word to one of the output ports of the switch module according to the destination port number of a cell in which the word is included.

7. A bus switch as claimed in claim 6, wherein the two or more independent cell switch means includes:
   a transaction cell switch for transferring words of a transaction cell to one of the output ports of the switch module; and
   a bus control signal cell switch for transferring words of a bus control signal cell to one of the output ports of the switch module.

8. A bus switch as claimed in claim 4, wherein the switch module transfers a word to the scheduler in the case where the word type identification bits in the word indicate that the word is part of a scheduling request cell.

9. A bus switch as claimed in claim 1, further comprising a bus control signal cell switch means for transferring a bus control signal cell, which has been generated by a bus bridge by converting a bus control signal to a cell, to another bus bridge that corresponds to the destination port number of the bus control signal cell.

10. A bus switch as claimed in claim 9, further comprising N bus control signal cell lines each of which is a special-purpose line specifically used for transferring the bus control signal cell between the bus bridge and the bus control signal cell switch means.

11. A bus switch as claimed in claim 1, further comprising N scheduling cell lines each of which is a special-purpose line specifically used for transferring scheduling cells between the bus bridge and the scheduler.

12. A bus switch as claimed in claim 1, wherein the bus bridge adds cell ending information bits, which indicates that a transaction cell will end after a predetermined number of words, to a specific word of the transaction cell, and thereby lets the scheduler know that transfer of the transaction cell in the switch module will be over after the predetermined number of words.

13. A bus switch as claimed in claim 1, wherein:
   the switch module is composed of M equivalent switch modules, and
   the cell to be generated by the bus bridge is partitioned into M subcells (M: integer larger than 1) each of which including a destination port number, by partitioning each word of the cell into M segments, and each of the M subcells is sent to corresponding one of the M switch modules respectively to be transferred by the corresponding switch module to a destination bus bridge according to the destination port number, and the M subcells which have been transferred to the destination bus bridge are combined together by the destination bus bridge.

14. A bus switch as claimed in claim 1, wherein:
   when the bus bridge received a device interrupt signal from a device, the bus bridge generates an interrupt signal cell corresponding to the device interrupt signal which is addressed to a host-side bus bridge, and sends the interrupt signal cell to the hostside bus bridge via the switch module, and
   the host-side bus bridge which received the interrupt signal cell informs an interrupt controller of a host processor about occurrence of an interrupt and information concerning the device that has outputted the device interrupt signal by activating one of host-side interrupt lines between the host-side bus bridge and the interrupt controller that corresponds to the device that has outputted the device interrupt signal.

15. A bus switch as claimed in claim 14, wherein the hostside bus bridge which received the interrupt signal cell sets a particular bit of its interrupt status register that corresponds to the device that has outputted the device interrupt signal so that the host processor will be able to read the value of the interrupt status register and thereby identify the device that has outputted the device interrupt signal, and informs the interrupt controller of the host processor about occurrence of an interrupt and information concerning the device that has outputted the device interrupt signal by activating one of the host-side interrupt lines that corresponds to the particular bit of the interrupt status register.

16. A bus switch as claimed in claim 1, wherein the switch module includes a collision detection means for judging whether or not cell collision at the output ports of the switch module will occur, in which a line corresponding to the destination port number of a cell is set when the cell is inputted to the switch module and the line is reset when the cell passed the switch module, and
   the collision detection means judges that the cell has not been given a transfer permission by the scheduler but has been supplied to the switch module by accident or the destination port number of the cell has changed by data error etc. and abandons the cell and outputs an error signal for starting error procedure, in the case where the line of the collision detection means corresponding to the destination port number of the inputted cell has already been set.

17. A bus switch as claimed in claim 1, wherein a cell buffer, in which cells generated by the bus bridge are temporarily stored waiting for the transfer permission by the scheduler, is provided separately from the bus bridge and connected to the bus bridge via lines.

18. A bus switch as claimed in claim 17, wherein the cell buffer is placed near the scheduler and the switch module.

* * * * *